US012244897B2

(12) United States Patent
Ding et al.

(10) Patent No.: US 12,244,897 B2
(45) Date of Patent: Mar. 4, 2025

(54) PLAYBACK OPTIMIZATION METHOD AND SYSTEM

(71) Applicant: SHANGHAI BILIBILI TECHNOLOGY CO., LTD., Shanghai (CN)

(72) Inventors: Jianqiang Ding, Shanghai (CN); Zhaoxin Tan, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/033,525

(22) PCT Filed: Aug. 9, 2021

(86) PCT No.: PCT/CN2021/111382
§ 371 (c)(1),
(2) Date: Apr. 24, 2023

(87) PCT Pub. No.: WO2022/095527
PCT Pub. Date: May 12, 2022

(65) Prior Publication Data
US 2023/0388590 A1 Nov. 30, 2023

(30) Foreign Application Priority Data
Nov. 3, 2020 (CN) .......................... 202011211482.7

(51) Int. Cl.
*H04N 21/462* (2011.01)
*H04N 19/40* (2014.01)
(Continued)

(52) U.S. Cl.
CPC .......... *H04N 21/462* (2013.01); *H04N 19/40* (2014.11); *H04N 21/41407* (2013.01);
(Continued)

(58) Field of Classification Search
CPC .......... H04N 21/462; H04N 21/41407; H04N 21/44004; H04N 21/44209;
(Continued)

(56) References Cited

U.S. PATENT DOCUMENTS 11,102,260 B1 * 8/2021 Wu ..................... H04L 65/612
2007/0116117 A1 * 5/2007 Tong ................... H04N 19/192
375/E7.181
(Continued)

FOREIGN PATENT DOCUMENTS

CN 105992058 A 10/2016
CN 106250019 A 12/2016
(Continued)

OTHER PUBLICATIONS

International Patent Application No. PCT/CN2021/111382; Int'l Search Report; dated Nov. 17, 2021; 2 pages.

*Primary Examiner* — James R Sheleheda
(74) *Attorney, Agent, or Firm* — BakerHostetler

(57) ABSTRACT

A method of optimizing playback, the method including: determining whether a player is in a freezing state; obtaining freezing information of the player when the player is in the freezing state; and determining a freezing type based on the freezing information, wherein the freezing type is used to instruct the player to perform a corresponding optimization operation. According to the present application, a freezing classification may be performed based on the freezing information to obtain refined freezing types, and different optimization strategies may be formulated respectively based on the freezing types to implement playback optimization, thereby improving playback optimization effect and optimization efficiency and improving playback experience.

14 Claims, 11 Drawing Sheets

(51) Int. Cl.
  *H04N 21/414* (2011.01)
  *H04N 21/44* (2011.01)
  *H04N 21/442* (2011.01)
  *H04N 21/4425* (2011.01)
  *H04N 21/845* (2011.01)

(52) U.S. Cl.
  CPC . *H04N 21/44004* (2013.01); *H04N 21/44209* (2013.01); *H04N 21/4424* (2013.01); *H04N 21/4425* (2013.01); *H04N 21/8456* (2013.01)

(58) Field of Classification Search
  CPC ........... H04N 21/4424; H04N 21/4425; H04N 21/8456; H04N 19/40
  See application file for complete search history.

(56) References Cited

U.S. PATENT DOCUMENTS

| | | | | |
|---|---|---|---|---|
| 2008/0288977 | A1* | 11/2008 | Howcroft | H04N 21/4316 725/105 |
| 2009/0063699 | A1* | 3/2009 | Chapweske | H04N 21/8193 709/233 |
| 2009/0193100 | A1 | 7/2009 | Moradi et al. | |
| 2013/0018632 | A1* | 1/2013 | Field | G06Q 30/0272 702/183 |
| 2013/0290492 | A1* | 10/2013 | ElArabawy | H04L 47/2416 709/219 |
| 2013/0343222 | A1* | 12/2013 | Chen | H04L 43/55 370/252 |
| 2014/0020004 | A1* | 1/2014 | Hu | H04N 17/004 725/14 |
| 2014/0098899 | A1* | 4/2014 | Mohandas | H04N 19/436 375/240.27 |
| 2014/0314321 | A1* | 10/2014 | Gu | H04N 17/004 382/190 |
| 2015/0215359 | A1* | 7/2015 | Bao | H04L 65/80 709/219 |
| 2016/0150228 | A1* | 5/2016 | Greene | H04N 5/50 348/192 |
| 2017/0244614 | A1* | 8/2017 | Wu | H04L 47/762 |
| 2018/0109587 | A1* | 4/2018 | Spilka | H04L 65/613 |
| 2019/0272088 | A1 | 9/2019 | Liu | |
| 2021/0058656 | A1* | 2/2021 | Meng | H04N 21/25858 |
| 2021/0120292 | A1* | 4/2021 | Liu | H04N 17/00 |
| 2022/0272397 | A1* | 8/2022 | Sturm | H04N 21/2402 |
| 2023/0007188 | A1* | 1/2023 | Han | H04N 21/44209 |

FOREIGN PATENT DOCUMENTS

| | | |
|---|---|---|
| CN | 107241650 A | 10/2017 |
| CN | 107566890 A | 1/2018 |
| CN | 107690077 A | 2/2018 |
| CN | 108108303 A | 6/2018 |
| CN | 108235149 A | 6/2018 |
| CN | 108270750 A | 7/2018 |
| CN | 108304274 A | 7/2018 |
| CN | 108347598 A | 7/2018 |
| CN | 108449609 A | 8/2018 |
| CN | 108900520 A | 11/2018 |
| CN | 109286854 A | 1/2019 |
| CN | 109561347 A | 4/2019 |
| CN | 109587555 A | 4/2019 |
| CN | 110049373 A | 7/2019 |
| CN | 110225417 A | 9/2019 |
| CN | 110888781 A | 3/2020 |
| CN | 110941551 A | 3/2020 |
| CN | 111064954 A | 4/2020 |
| CN | 111093116 A | 5/2020 |
| CN | 111107423 A | 5/2020 |
| CN | 111225387 A | 6/2020 |
| CN | 111277846 A | 6/2020 |
| CN | 111601102 A | 8/2020 |
| CN | 111726608 A | 9/2020 |
| CN | 112423096 A | 2/2021 |
| WO | WO 2017/091961 A1 | 6/2017 |

* cited by examiner

PLAYBACK OPTIMIZATION METHOD AND SYSTEM

CROSS-REFERENCE TO RELATED APPLICATIONS

The present application is the U.S. National Stage of International Application No. PCT/CN2021/111382, filed on Aug. 9, 2021, which claims priority to Chinese Patent Application No. 202011211482.7, filed on Nov. 3, 2020, and entitled "PLAYBACK OPTIMIZATION METHOD AND SYSTEM", both of which are incorporated herein by reference in their entireties.

TECHNICAL FIELD

The present application relates to the field of audio processing technologies, and in particular, to a playback optimization method and system, a computer device, and a computer-readable storage medium.

BACKGROUND ART

With the development of the Internet and multimedia technologies, people begin to use network technologies to perform an online media playback. For example, based on a dynamic adaptive streaming over HTTP (DASH) technology, high-quality streaming media can be delivered over the Internet through a conventional HTTP network server. DASH may decompose content into a series of relatively small file clips based on HTTP, and each clip includes playable content with a short length, and a total length of the content may be up to several hours. The content may be made into alternative clips at a plurality of bit rates to provide versions at the plurality of bit rates for selection. When the content is played back by a DASH player, the DASH player may automatically select, based on a current network condition, to download and play a specific alternative clip, to adapt to a continuously changing network condition, provide high-quality playback experience, and reduce playback freezing.

However, during a playback process of an online video, it is difficult to avoid freezing actually, which severely affects playback experience. It should be appreciated by the applicant that when the freezing occurs during a media playback process, the freezing is generally eliminated by switching the quality to perform playback optimization. However, the above playback optimization for the freezing has a poor effect and affects the playback experience.

SUMMARY OF THE INVENTION

Embodiments of the present application aim to provide a playback optimization method and system, a computer device, and a computer-readable storage medium, to solve the following problems: playback optimization for freezing has a poor effect and affects playback experience.

An aspect of the embodiments of the present application provides a playback optimization method, including: judging whether a player is in a freezing state; obtaining freezing information of the player when the player is in the freezing state; and determining a freezing type based on the freezing information, where the freezing type is used to instruct the player to perform a corresponding optimization operation.

Optionally, the freezing information includes first freezing information, and the first freezing information is used to locate a target freezing reason of freezing; and determining the freezing type based on the freezing information includes: locating the target freezing reason from a plurality of freezing reasons based on the first freezing information; and determining the freezing type at least based on the target freezing reason, where the plurality of freezing reasons include at least one or more of the following: various seeking reasons associated with media seeking, various network reasons associated with a network, various media reasons associated with media, various GAP reasons associated with time stamps of buffers, various performance reasons associated with performance, or various internal player reasons associated with the interior of the player.

Optionally, the freezing information further includes second freezing information, and the second freezing information is used to locate an inducing freezing reason of freezing; and determining the freezing type at least based on the target freezing reason includes: determining the freezing type based on the inducing freezing reason and the target freezing reason.

Optionally, the inducing freezing reason includes a target playback state of the player, where the target playback state is one of a plurality of playback states of the player, and the plurality of playback states include more of a normal playback state, a video seeking state, a quality switching state, a video source switching state, a video source updating state, or a video source appending state.

Optionally, the first freezing information includes at least one or more of the following: buffer information, network information, ready state information of a media element, time stamp information of buffers, performance information, decoding information, or error state information of the media element.

Optionally, locating the target freezing reason from the plurality of freezing reasons based on the freezing information includes: when the player is in a video seeking state, judging whether a video seeking time is inside a current buffer; when the video seeking time is inside the current buffer, determining the target freezing reason as a first seeking reason in the seeking reasons, where the first seeking reason is that the video seeking time is inside the current buffer; and/or when the video seeking time is outside the current buffer, determining the target freezing reason as a second seeking reason in the seeking reasons, where the second seeking reason is that the video seeking time is outside the current buffer.

Optionally, locating the target freezing reason from the plurality of freezing reasons based on the freezing information further includes: when the player is not in a video seeking state, judging whether there is a time stamp gap between a current buffer and a next buffer of the current buffer; when there is the time stamp gap, judging whether the time stamp gap is less than a current playback time point; and when the time stamp gap is less than the current playback time point, determining the target freezing reason as a first-type GAP reason in the GAP reasons; and/or when the time stamp gap is not less than the current playback time point, determining the target freezing reason as a second-type GAP reason in the GAP reasons.

Optionally, locating the target freezing reason from the plurality of freezing reasons based on the freezing information further includes: when the player is not in a video seeking state, and there is no time stamp gap between a current buffer and a next buffer of the current buffer, judging whether a remaining length of the current buffer is greater than a first threshold; when the remaining length of the current buffer is greater than the first threshold, judging whether a value of a ready state of the media element is greater than a second threshold; and when the value of the ready state of the media element is greater than the second threshold, determining the target freezing reason as a first-type performance reason in the performance reasons; and/or when the value of the ready state of the media element is not greater than the second threshold, determining the target freezing reason as a second-type performance reason in the performance reasons.

Optionally, locating the target freezing reason from the plurality of freezing reasons based on the freezing information further includes: when the player is not in a video seeking state, there is no time stamp gap between a current buffer and a next buffer of the current buffer, and a remaining length of the current buffer is not greater than a first threshold, judging whether a quantity of buffers is zero; when the quantity of buffers is not zero, judging whether a current playback time point is not greater than a playback start time point; when the current playback time point is not greater than the playback start time point, determining the target freezing reason as playback start freezing in the internal player reasons; when the current playback time point is greater than the playback start time point, judging whether a network speed is less than a third threshold; and when the network speed is less than the third threshold, determining the target freezing reason as network speed not support in the network reasons; and/or when the network speed is not less than the third threshold, determining the target freezing reason as the internal player reasons.

Optionally, locating the target freezing reason from the plurality of freezing reasons based on the freezing information further includes: when the player is not in a video seeking state, there is no time stamp gap between a current buffer and a next buffer of the current buffer, a remaining length of the current buffer is not greater than a first threshold, and a quantity of buffers is zero, judging whether a difference between a total duration of a current video and a current playback time point is less than a fourth threshold; and when the difference between the total duration of the current video and the current playback time point is less than the fourth threshold, determining the target freezing reason as playback end freezing in the internal player reasons;

Optionally, locating the target freezing reason from the plurality of freezing reasons based on the freezing information further includes: when the player is not in a video seeking state, there is no time stamp gap between a current buffer and a next buffer of the current buffer, a remaining length of the current buffer is not greater than a first threshold, a quantity of buffers is zero, and a difference between a total duration of a current video and a current playback time point is not less than a fourth threshold, judging whether a Video/Audio error occurs; and when the Video/Audio error occurs, determining the target freezing reason as one of a connection timeout, a video stream reading timeout, a download timeout, a download clip error, or network speed not supported in the network reasons; or when the Video/Audio error does not occur, determining the target freezing reason as an unknown network error in the network reasons.

Optionally, locating the target freezing reason from the plurality of freezing reasons based on the freezing information further includes: determining, based on a value of an error state of a media element, the target freezing reason as one of media aborted, a media network error, a media decoding error, or media source not supported in the media reasons; or when a video decoding duration is greater than a fifth threshold or an audio decoding duration is greater than a sixth threshold, determining the target freezing reason as media decoding performance not supported.

Optionally, the method further includes performing the corresponding optimization operation based on the freezing type, which includes: when the freezing type corresponds to the connection timeout in the network reasons, progressively increasing a timeout duration to obtain a maximum duration for the connection timeout; when the freezing type corresponds to the video stream reading timeout in the network reasons, progressively increasing a timeout duration to obtain a maximum duration for the video stream reading timeout; when the freezing type corresponds to the download timeout in the network reasons, progressively increasing a timeout duration to obtain a maximum duration for the download timeout; and when the freezing type corresponds to the download clip error in the network reasons, switching to an alternative address; or when the freezing type corresponds to the network speed not supported in the network reasons, adjusting, based on a network speed, the maximum duration for the connection timeout, the maximum duration for the video stream reading timeout, and the maximum duration for the download timeout, or increasing a time interval between adjacent requests.

Optionally, the method further includes performing the corresponding optimization operation based on the freezing type, which includes: when the freezing type corresponds to the media decoding error in the media reasons, performing a video transcoding operation or preferentially using a video file in a specified coding format; when the freezing type corresponds to the media source not supported in the media reasons, degrading to obtain a video file in a target format; or when the freezing type corresponds to the media decoding performance not supported in the media reasons, switching a video quality or enabling a hardware acceleration function.

Optionally, the method further includes performing the corresponding optimization operation based on the freezing type, which includes: when the freezing type corresponds to the GAP reasons, skipping over the current playback time point and seeking to the playback start time point of the next buffer of the current buffer.

Optionally, the method further includes performing the corresponding optimization operation based on the freezing type is further included, which includes: when the freezing type corresponds to the playback start freezing in the internal player reasons, taking pre-rendered start data as start playback data; or when the freezing type corresponds to the playback end freezing in the internal player reasons, setting consistent time stamps for audio and video ends.

An aspect of the embodiments of the present application further provides a playback optimization system, including: a judgment module, configured to judge whether a player is in a freezing state; an obtaining module, configured to obtain freezing information of the player when the player is in the freezing state; and a determining module, configured to determine a freezing type based on the freezing information, where the freezing type is used to instruct the player to perform a corresponding optimization operation.

An aspect of the embodiments of the present application further provides a computer device, including a memory, a processor, and computer-readable instructions stored on the memory and executable on the processor, where when executing the computer-readable instructions, the processor implements the following steps: judging whether a player is in a freezing state; obtaining freezing information of the player when the player is in the freezing state; and determining a freezing type based on the freezing information, where the freezing type is used to instruct the player to perform a corresponding optimization operation.

An aspect of the embodiments of the present application further provides a computer-readable storage medium, including a memory, a processor, and computer-readable instructions stored on the memory and executable on the processor, where when executing the computer-readable instructions, the processor implements the following steps: judging whether a player is in a freezing state; obtaining freezing information of the player when the player is in the freezing state; and determining a freezing type based on the freezing information, where the freezing type is used to instruct the player to perform a corresponding optimization operation.

According to the playback optimization method and system, the device, and the computer-readable storage medium provided in the embodiments of the present application, a freezing classification may be performed based on the freezing information to obtain refined freezing types, and different optimization strategies may be formulated respectively based on the freezing types to implement playback optimization, thereby improving a playback optimization effect and optimization efficiency and improving playback experience.

DETAILED DESCRIPTION OF EMBODIMENTS

Figure 1:
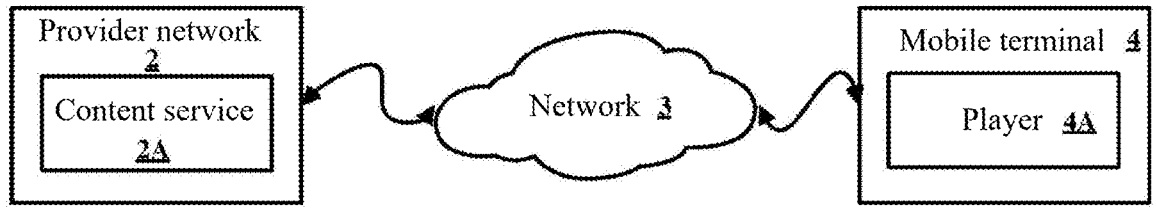
FIG. 1 is a diagram schematically showing an application environment of a playback optimization method according to an embodiment of the present application.

To make the objectives, technical solutions, and advantages of the present application clearer and more comprehensible, the present application will be further described in detail with reference to the accompanying drawings and embodiments. It should be understood that the specific embodiments described herein are merely intended to explain the present application, and are not intended to limit the present application. All other embodiments obtained by those of ordinary skill in the art based on the embodiments of the present application without creative efforts shall fall within the protection scope of the present application.

It should be noted that the descriptions related to "first", "second", and the like in the embodiments of the present application are merely used for the illustrative purpose, and should not be construed as indicating or implying the relative importance thereof or implicitly indicating the number of technical features indicated. Thus, features defined with "first" and "second" may explicitly or implicitly include at least one of the features. In addition, technical solutions of various embodiments can be combined with each other, but they must be based on the implementation by those of ordinary skill in the art. When a combination of technical solutions is contradictory or cannot be implemented, it should be considered that such a combination of the technical solutions neither exists, nor falls within the protection scope claimed by the present application.

In the description of the present application, it should be understood that, the reference numerals of steps do not indicate the order of execution of the steps, but are merely to facilitate the description of the present application and differentiation between the steps, and thus will not be interpreted as limiting the present application.

Some terms in the present application are explained below.

Freezing: in a normal playback state, changes of a current playback time point CURRENT_TIME are detected at an interval of N milliseconds, and if the current playback time point CURRENT_TIME has no changes, one freezing is recorded.

Current playback time point (CURRENT_TIME): current video playback duration that starts at 0 seconds and ends until the video duration ends.

Buffer (BUFFERED): a set of playback start time points START_TIME and playback end time points END_TIME. It should be noted that during a playback process of a player, there may be one or more buffers.

Current buffer (CURRENT_BUFFERED): the buffer where the current playback time point CURRENT_TIME is located, that is, a playback start time point START_TIME of the buffer≤a current playback time point CURRENT_TIME of the buffer≤a playback end time point END_TIME of the buffer.

Remaining length of the current buffer (BUFFER_LENGTH): the playback end time point END_TIME of the current buffer−the current playback time point CURRENT_TIME.

Seeking state (SEEKING_STATE): whether playback is in a seeking current time state, which generally occurs when a progress bar is dragged.

Network information (NETWORK_STATE): including network speed information, download clip warning information, and the like.

Error state of a media element (ERROR_STATE): original error information of an HTML5 Video element, as shown in Table 1.

TABLE 1

| Name | Value | Description |
|---|---|---|
| MEDIA_ERR_ABORTED | 1 | An extraction process of a media resource is aborted at a request of a user. |
| MEDIA_ERR_NETWORK | 2 | After a media resource is established to be available, a specific described network error causes a user agent to stop obtaining the media resource. |

TABLE 1-continued

| Name | Value | Description |
|---|---|---|
| MEDIA_ERR_DECODE | 3 | After a media resource is established to be available, a specific described error occurs when the resource is decoded. |
| MEDIA_ERR_SRC_NOT_SUPPORTED | 4 | A media resource indicated by an attribute or an allocated media provider object is inappropriate. |

Ready state of a media element (READY_STATE) and video state information of a HTML5 Video element are shown in Table 2.

TABLE 2

| Constant | Value | Description |
|---|---|---|
| HAVE_NOTHING | 0 | Information of a related media resource is unavailable. |
| HAVE_METADATA | 1 | Data of a current playback position is unavailable. |
| HAVE_CURRENT_DATA | 2 | Data of a current playback position is available, but available data is not enough (e.g., there is no data for a next frame). |
| HAVE_FUTURE_DATA | 3 | Data of a current playback position is available, and at least data for some time in the future is also available (e.g., there are at least two frames). |
| HAVE_ENOUGH_DATA | 4 | Data is available enough and a download rate is high enough, and media may be played to the end without interference. |

Decoding state (DECODING_STATE): possibly including video decoding information such as a video decoding duration VIDEO_DECODING_TIME, and audio decoding information such as an audio decoding duration AUDIO_DECODING_TIME.

GAP: used to represent whether there are a plurality of buffers, and whether non-continuous time stamps are stored for the plurality of buffers.

FIG. 1 is a schematic diagram schematically showing environment application of a playback optimization method according to Embodiment 1 of the present application. A provider network 2 may be connected to a mobile terminal 4 via a network 3. The provider network 2 may provide a content service 2A.

The content service 2A may include a content streaming service such as an Internet protocol (e.g., a DASH) video streaming service. The content service 2A may be configured to provide content such as video, audio, text data, and a combination thereof. The content may include content streams (e.g., video streams, audio streams, and information streams), content files (e.g., video files, audio files, and text files), and/or other data. When the content service 2A is configured to distribute the video streams based on the DASH, the video data and the audio data are provided separately and independently, for example, an address of the video data is a.bilivideo.com, and an address of the audio data is b.bilivideo.com.

The provider network 2 may be located in a data center, for example, on a single site, or distributed at different geographical positions (for example, on a plurality of sites).

The provider network 2 may provide services via one or more networks 3. The network 3 includes various network devices, for example, routers, switches, multiplexers, hubs, modems, network bridges, repeaters, firewalls, proxy devices, and/or the like. The network 3 may include physical links, for example, coaxial cable links, twisted-pair cable links, optical fiber links, and a combination thereof. The network 3 may include wireless links, such as cellular links, satellite links, and Wi-Fi links.

The mobile terminal 4 may be configured to access content and a service of the provider network 2. The mobile terminal 4 may include any type of electronic devices, for example, mobile devices, tablet devices, laptop computers, workstations, virtual reality devices, game devices, set-top boxes, digital streaming media devices, vehicle terminals, smart televisions, set-top boxes, and the like.

The mobile terminal 4 may be associated with one or more users. A single user may access the provider network 2 by using one or more mobile terminals 4. The mobile terminal 4 may travel to various positions and use different networks to access the provider network 2.

The mobile terminal 4 may include a player 4A. The player 4A outputs (e.g., displays, renders, or presents) content to a user. The player 4A may be a specific player (e.g., a bilibili player), a page player, or a player based on a WeChat applet, or the like. The content may include a video, audio, comment content, a bullet-screen comment bonus scene and/or the like. The comment content may be words and the like, and may have different colors, sizes, animations, scrolling directions, and the like. The bullet-screen comment bonus scene may be pictures embedded in the words, or may be interaction components or hyperlinks.

When an online video is played by the player 4A, it is difficult to avoid freezing actually, which severely affects playback experience. It should be appreciated by the applicant that when the freezing occurs during a media playback process, a current user behavior is generally detected by frames per second (FPS), networks, and the like without analysis, which cannot locate a freezing reason accurately, causing that an effective freezing optimization solution cannot be customized. Playback optimization has a poor effect and affects playback experience.

The present application is intended to obtain and classify buffering types BUFFERING_TYPE based on multidimensional information such as video information, network information, buffer information, and decoding information, to accurately locate the freezing reason, and create different optimization strategies to implement the playback optimization. A plurality of embodiments provided in the following description are used to implement the playback optimization described above.

Embodiment 1

Figure 2:
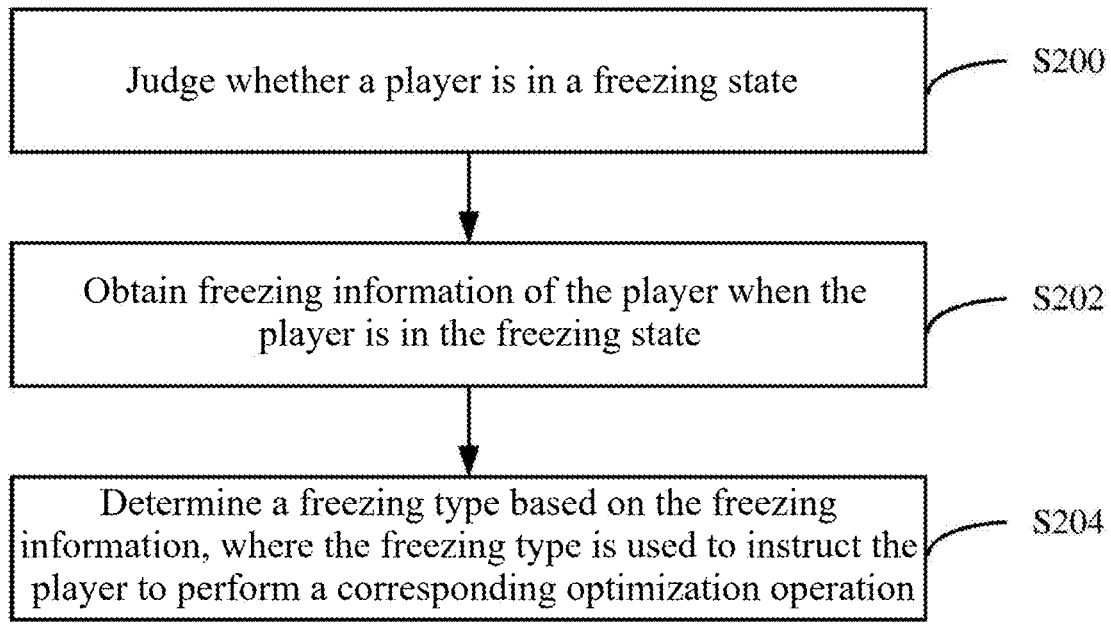
FIG. 2 is a flowchart schematically showing a playback optimization method according to Embodiment 1 of the present application.

FIG. 2 is a flowchart schematically showing a playback optimization method according to Embodiment 1 of the present application. The method may be implemented in a mobile terminal 4.

As shown in FIG. 2, the playback optimization method may include steps S200 to S204.

In step S200, whether a player is in a freezing state is judged.

Changes of a current playback time point CURRENT_TIME may be detected at a predetermined time interval (e.g., five milliseconds), and if the current playback time point CURRENT_TIME has no changes, the player is determined to be in the freezing state.

In step S202, freezing information of the player is obtained when the player is in the freezing state.

The freezing information may include various types of state information, log information, and the like in the player, for example, state information of the player, attributive information, state information, and error information in the HTML5 video element, internal buffer information, network speed information, GAP information, performance information, and various other types of information.

The freezing information may include first freezing information, and the first freezing information is used to locate a target freezing reason of freezing.

The first freezing information includes at least one or more of the following: buffer information, network information, ready state information of a media element, time stamp information of buffers, performance information, decoding information, or error state information of the media element.

The freezing information may alternatively include the first freezing information and the second freezing information, the first freezing information is used to locate the target freezing reason of the freezing, and the second freezing information is used to locate an inducing freezing reason of the freezing.

It should be noted that the freezing information may alternatively include other information.

In step S204, a freezing type is determined based on the freezing information, where the freezing type is used to instruct the player to perform a corresponding optimization operation.

A mapping relationship may be established between the freezing type and the corresponding optimization operation and stored in a mapping table.

Figure 3:
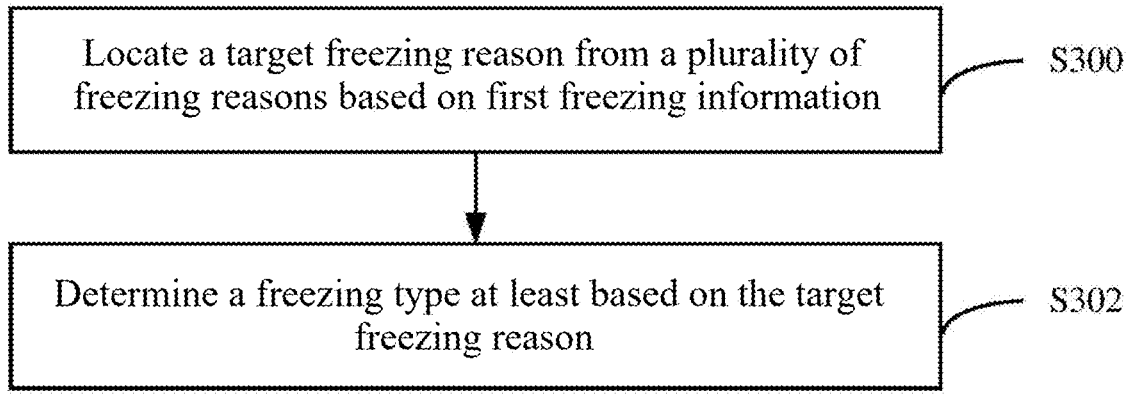
FIG. 3 is a sub-step diagram of step S204 in FIG. 2.

To implement an efficient and refined classification, as shown in FIG. 3, step S204 may include steps S300 and S302. In step S300, the target freezing reason is located from a plurality of freezing reasons based on first freezing information. In step S302, the freezing type is determined at least based on the target freezing reason. Each freezing reason may be classified by number, for example, corresponding freezing reasons may be distinguished by "YZ", where "Y" represents a main category identifier of a freezing reason and is used to distinguish between main categories of freezing reasons, and "Z" is used to distinguish between sub-categories of freezing reasons in a corresponding main category of freezing reasons. As an example, the plurality of freezing reasons include at least one or more of the following:

(0) an unknown reason: numbered 00, which may be used as a default value;
(1) various seeking reasons associated with media seeking:
a general seeking reason (SEEKING): numbered 10;
a video seeking time being inside the current buffer (SEEKING_INSIDE_BUFFERED): numbered 11;
the video seeking time being outside the current buffer (SEEKING_OUTSIDE_BUFFERED): numbered 12;
(2) various network reasons associated with a network:
a general network reason (NETWORK): numbered 20;
a connection timeout (NETWORK_CONNECT_TIMEOUT): numbered 21;
a video stream reading timeout (NETWORK_READING_TIMEOUT): numbered 22;
a download timeout (NETWORK_DOWNLOAD_TIMEOUT): numbered 23;
a download clip error (NETWORK_DOWNLOAD_ERROR): numbered 24;
network speed not supported (NETWORK_POOR): numbered 25;
(3) various media reasons associated with media:
a general media reason (MEDIA): numbered 30;
media aborted (MEDIA_ERR_ABORTED): numbered 31;
a media network error (MEDIA_ERR_NETWORK): numbered 32;
a media decoding error (MEDIA_ERR_DECODE): numbered 33;
media source not supported (MEDIA_ERR_SRC_NOT_SUPPORTED): numbered 34;
media decoding performance not supported (MEDIA_DECODING_PERFORMANCE): numbered 35;
(4) various GAP reasons associated with time stamps of buffers:
a general GAP reason (GAP): numbered 40;
a first-type GAP reason (GAP_BEFORE_CURRENT): numbered 41 and may be a video GAP reason;
a second-type GAP reason (GAP_AFTER_CURRENT): numbered 42 and may be an audio GAP reason;
(5) various performance reasons associated with performance:
a first-type performance reason (PERFORMANCE): numbered 50 and may be a preset general performance reason; and
a second-type performance reason (PERFORMANCE_UNKNOWN): numbered 51 and may be an unknown performance reason;
(6) various internal player reasons associated with the interior of the player:
a general internal player reason (INTERNAL): numbered 60;
playback start freezing in the player (INTERNAL_STARTING): numbered 61;
playback end freezing in the player (INTERNAL_ENDING): numbered 62;
an abnormal buffer quantity freezing reason in the player (INTERNAL_UNNORMAL_RANGES): numbered 63.

Figure 4:
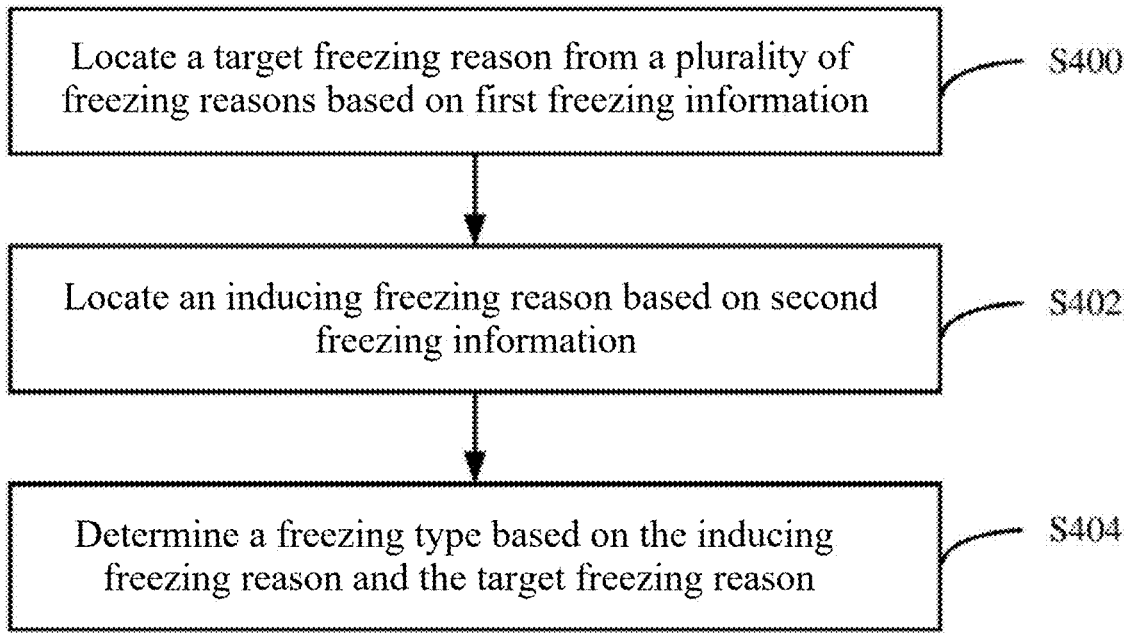
FIG. 4 is a sub-step diagram of step S204 in FIG. 2.

To provide a further refined classification to help subsequent refined optimization, as shown in FIG. 4, step S204 may further include steps S400 to S404. In step S400, the target freezing reason is located from a plurality of freezing reasons based on the first freezing information. In step S402, an inducing freezing reason is located based on second freezing information. In step S404, the freezing type is determined based on the inducing freezing reason and the target freezing reason. Each inducing freezing reason may be recorded by number, for example: a number of a corresponding inducing freezing reason may be recorded in a form of "X". In an exemplary embodiment, the inducing freezing reason includes a target playback state of the player, where the target playback state is one of a plurality of playback states of the player, and the plurality of playback states may include:

a normal playback state (PLAYING): numbered 1;
a video seeking state (SEEKING): numbered 2;
a quality switching state (SWITCHING_QUALITY): numbered 3;
a video source switching state (SWITCHING_SOURCE): numbered 4;
a video source updating state (UPDATING_SOURCE): numbered 5;
a video source appending state (APPENDING_SOURCE): numbered 6.

As an example, when the player is in the quality switching state (numbered 3), and the target freezing reason of the player is the media source not supported (numbered 34), the freezing type may be determined as "the quality switching state+the media source not supported", that is, the freezing type is obtained as "X"+"YZ", namely "XYZ", and the number thereof is 334.

As an example, when the player is in the normal playback state (numbered 1), and the target freezing reason of the player is the connection timeout (numbered 21), a corresponding number of the freezing type is 121.

As an example, video data and audio data are obtained from different addresses if they are based on DASH. When the player is in the quality switching state (numbered 3), and the target freezing reason of the player is the audio clip download error (numbered 24) and the video clip download error (numbered 24), a corresponding number of the freezing type is 32424.

The inducing freezing reason may assist in adjusting a playback strategy for a corresponding playback state, for example, a playback strategy for the freezing occurred in the quality switching state (numbered 3). An audio and video address request needs to be changed when quality switching is needed, and a specific audio/video quality to be selected that may cause the freezing may be located based on 3YZ, and a playback strategy for quality switching is optimized through inverse derivation from YZ.

The applicant finds that there may be a specific association relationship between the freezing reasons, for example, a freezing reason A and a freezing reason B may have one or more same judgment conditions, a probability of occurrence of the freezing reason A is greater than a probability of occurrence of the freezing reason B, the freezing reason A and the freezing reason B are mutually exclusive (that is, the two will not occur simultaneously), or whether the freezing reason A occurs depends on occurrence of the freezing reason B. In view of this, steps for efficiently and accurately locating the target freezing reason are provided below.

Figure 5:
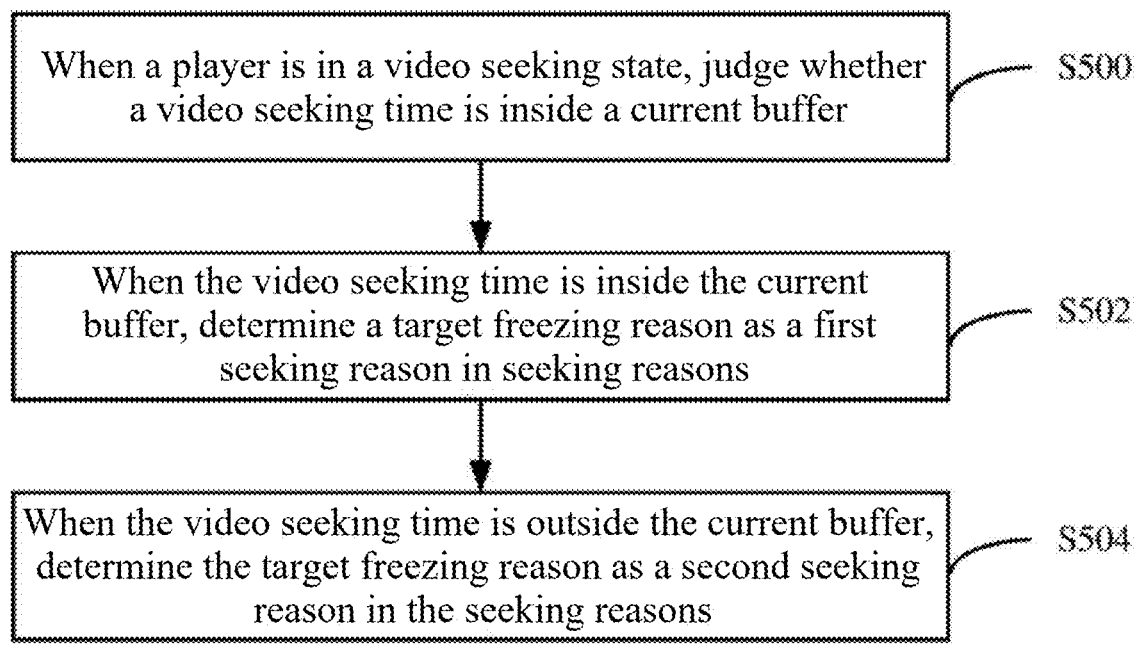
FIGS. 5 to 11 are a plurality of sub-step diagrams of step S400 in FIG. 4.

In an exemplary embodiment, as shown in FIG. 5, the step of locating the target freezing reason from the plurality of freezing reasons may include steps S500 to S504: step S500: when the player is in a video seeking state, judging whether a video seeking time is inside a current buffer; step S502: when the video seeking time is inside the current buffer, determining the target freezing reason as a first seeking reason in the seeking reasons, where the first seeking reason is that the video seeking time is inside the current buffer; and step S504: when the video seeking time is outside the current buffer, determining the target freezing reason as a second seeking reason in the seeking reasons, where the second seeking reason is that the video seeking time is outside the current buffer. This embodiment lies in that: whether the target freezing reason is caused by dragging a progress bar is determined preferentially.

Figure 6:
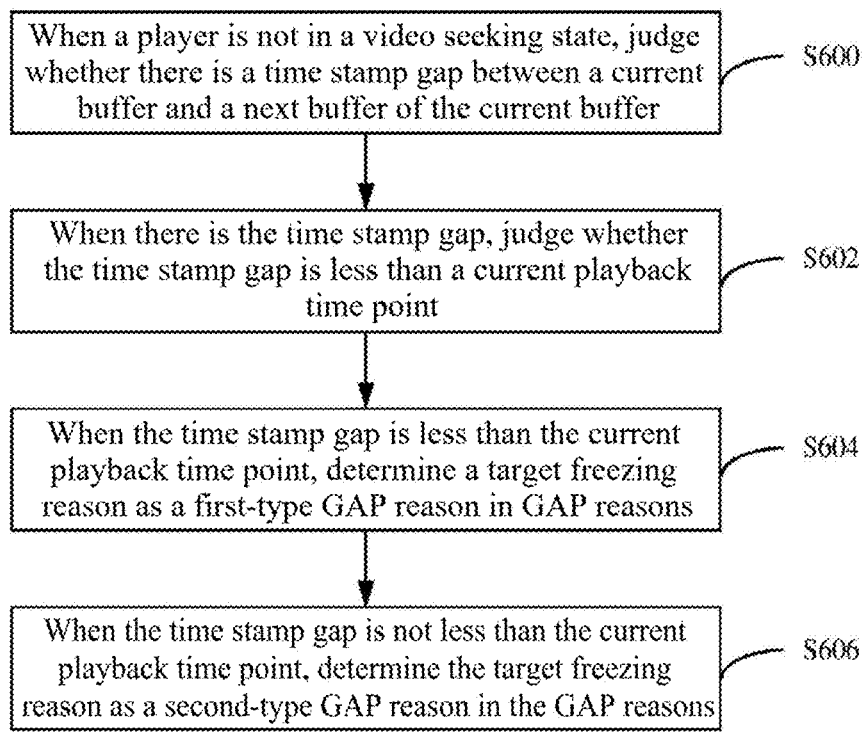

In an exemplary embodiment, as shown in FIG. 6, the step of locating the target freezing reason from the plurality of freezing reasons may include steps S600 to S606: step S600: when the player is not in a video seeking state, judging whether there is a time stamp gap between a current buffer and a next buffer of the current buffer; step S602: when there is the time stamp gap, judging whether the time stamp gap is less than a current playback time point; and step S604: when the time stamp gap is less than the current playback time point, determining the target freezing reason as a first-type GAP reason in the GAP reasons; and/or step S606: when the time stamp gap is not less than the current playback time point, determining the target freezing reason as a second-type GAP reason in the GAP reasons. This embodiment lies in that: after the seeking reasons are excluded, whether the target freezing reason is caused by GAP is determined preferentially.

Figure 7:
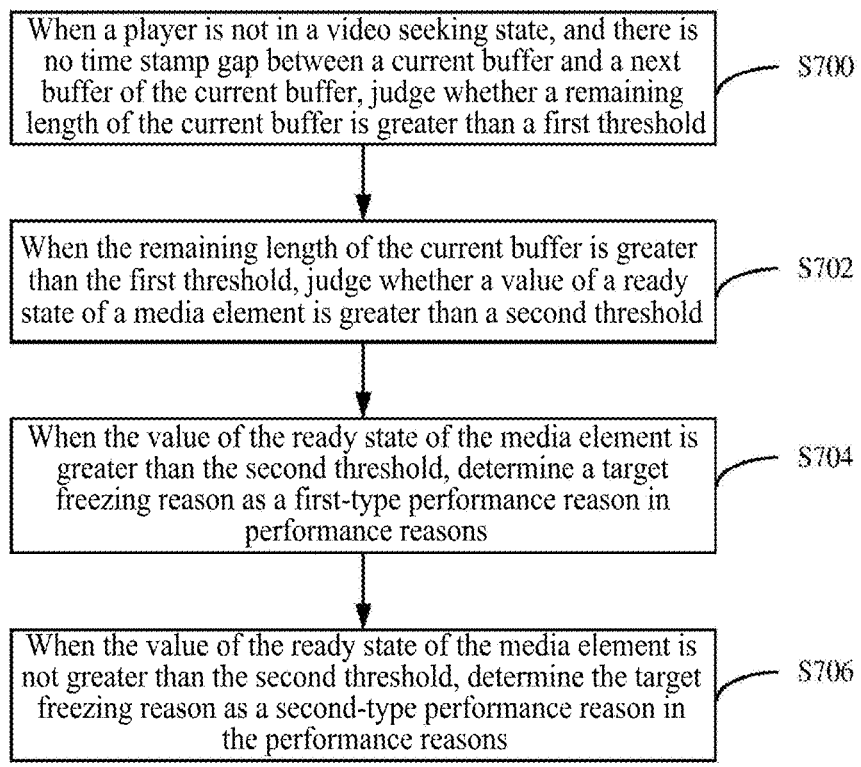

In an exemplary embodiment, as shown in FIG. 7, the step of locating the target freezing reason from the plurality of freezing reasons may include steps S700 to S706: step S700: when the player is not in a video seeking state, and there is no time stamp gap between a current buffer and a next buffer of the current buffer, judging whether a remaining length of the current buffer is greater than a first threshold; step S702: when the remaining length of the current buffer is greater than the first threshold, judging whether a value of a ready state of the media element is greater than a second threshold; step S704: when the value of the ready state of the media element is greater than the second threshold, determining the target freezing reason as a first-type performance reason in the performance reasons; and/or step S706: when the value of the ready state of the media element is not greater than the second threshold, determining the target freezing reason as a second-type performance reason in the performance reasons. This embodiment lies in that: after the seeking reasons and the GAP reasons are excluded, whether the target freezing reason is the performance reason is determined based on the remaining length of the current buffer and the ready state of the media element.

Figure 8:
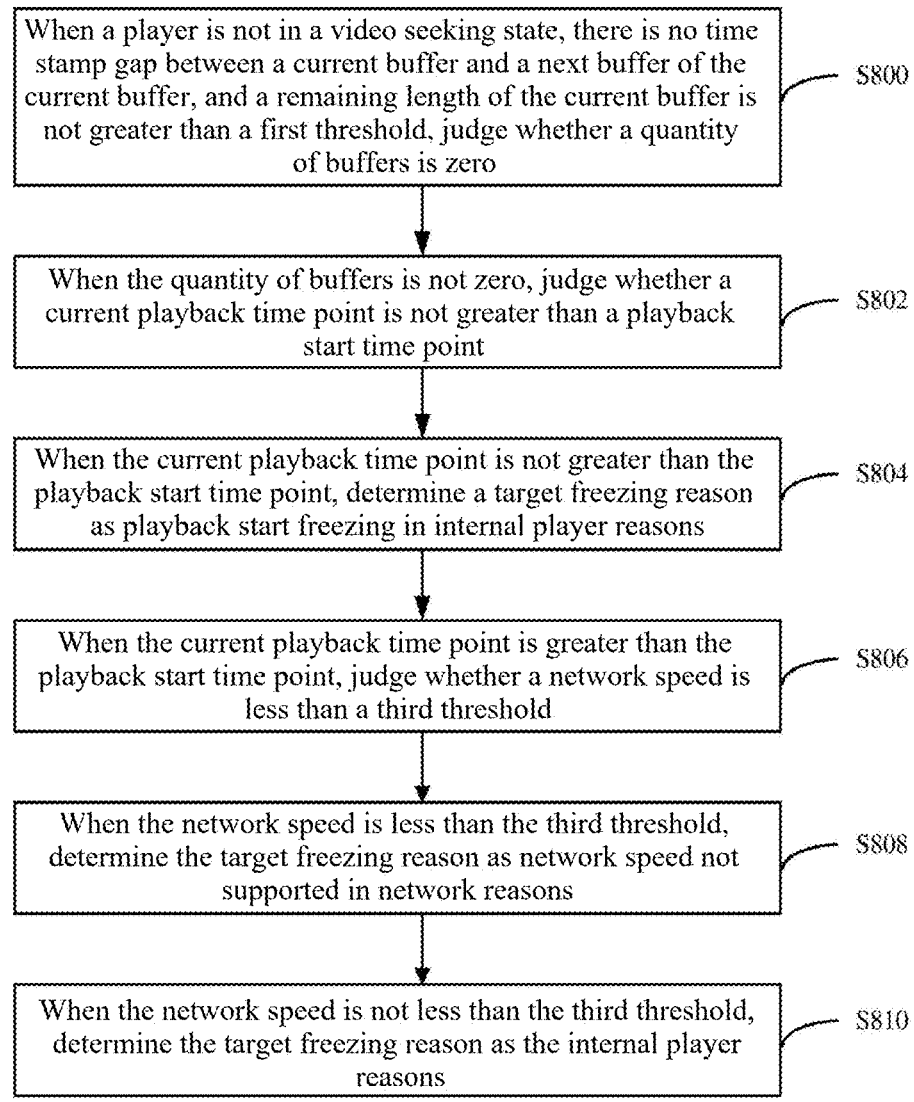

In an exemplary embodiment, as shown in FIG. 8, the step of locating the target freezing reason from the plurality of freezing reasons may include steps S800 to S810: step S800: when the player is not in a video seeking state, there is no time stamp gap between a current buffer and a next buffer of the current buffer, and a remaining length of the current buffer is not greater than a first threshold, judging whether a quantity of buffers is zero; step S802: when the quantity of buffers is not zero, judging whether a current playback time point is not greater than a playback start time point; step S804: when the current playback time point is not greater than the playback start time point, determining the target freezing reason as playback start freezing in the internal player reasons; step S806: when the current playback time point is greater than the playback start time point, judging whether a network speed is less than a third threshold; step S808: when the network speed is less than the third threshold, determining the target freezing reason as network speed not support in the network reasons; and/or step S810: when the network speed is not less than the third threshold, determining the target freezing reason as the internal player reasons. This embodiment lies in that: after the seeking reasons and the GAP reasons are excluded, whether the target freezing reason is the playback start freezing in the internal player reasons or the network speed not supported in the network reasons is determined based on the remaining length of the current buffer, the quantity of buffers, the current playback time point, and the playback start time point.

Figure 9:
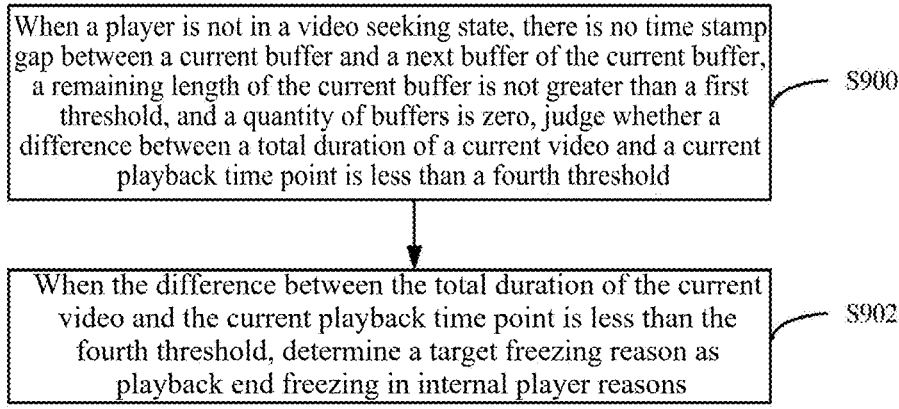

In an exemplary embodiment, as shown in FIG. 9, the step of locating the target freezing reason from the plurality of freezing reasons may include steps S900 and S902: step S900: when the player is not in a video seeking state, there is no time stamp gap between a current buffer and a next buffer of the current buffer, a remaining length of the current buffer is not greater than a first threshold, and a quantity of buffers is zero, judging whether a difference between a total duration of a current video and a current playback time point is less than a fourth threshold; and step S902: when the difference between the total duration of the current video and the current playback time point is less than the fourth threshold, determining the target freezing reason as playback end freezing in the internal player reasons. This embodiment lies in that: after the seeking reasons and the GAP reasons are excluded, whether the target freezing reason is the playback end freezing in the internal player reasons is determined based on the remaining length of the current buffer, the quantity of buffers, the total duration of the current video, and the current playback time point.

Figure 10:
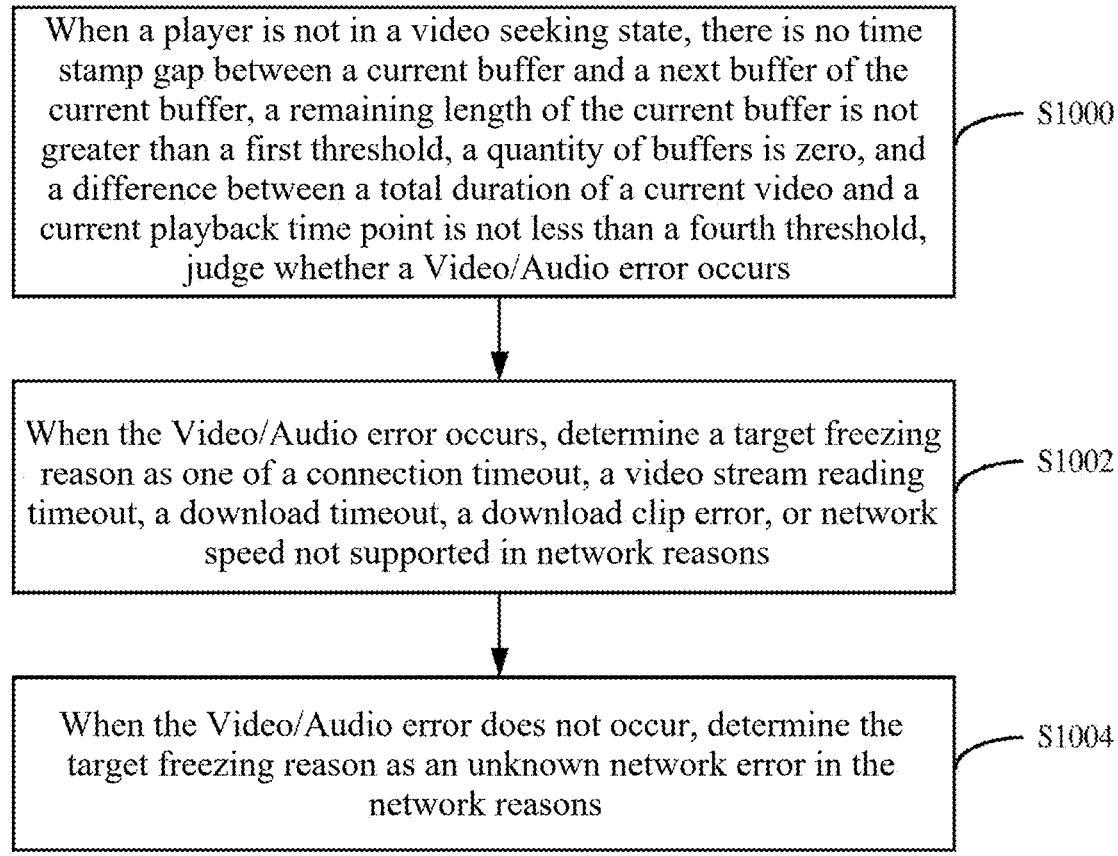

In an exemplary embodiment, as shown in FIG. 10, the step of locating the target freezing reason from the plurality of freezing reasons may include steps S1000 to S1004: step S1000: when the player is not in a video seeking state, there is no time stamp gap between a current buffer and a next buffer of the current buffer, a remaining length of the current buffer is not greater than a first threshold, a quantity of buffers is zero, and a difference between a total duration of a current video and a current playback time point is not less than a fourth threshold, judging whether a Video/Audio error occurs; and step S1002: when the Video/Audio error occurs, determining the target freezing reason as one of a connection timeout, a video stream reading timeout, a download timeout, a download clip error, or network speed not support in the network reasons; or step S1004: when the Video/Audio error does not occur, determining the target freezing reason as an unknown network error in the network reasons. This embodiment lies in that: after the seeking reasons and the GAP reasons are excluded, whether the target freezing reason is a specific reason in the network reasons is determined based on the remaining length of the current buffer, the quantity of buffers, the total duration of the current video, the current playback time point, and the Video/Audio error, where the Video error may be obtained based on a network warning error code VIDEO_WARNING_CODE existing in a current video clip in the internal state of the player; and the Audio error may be obtained based on a network warning error code AUDIO_WARNING_CODE existing in a current audio clip in the internal state of the player.

Figure 11:
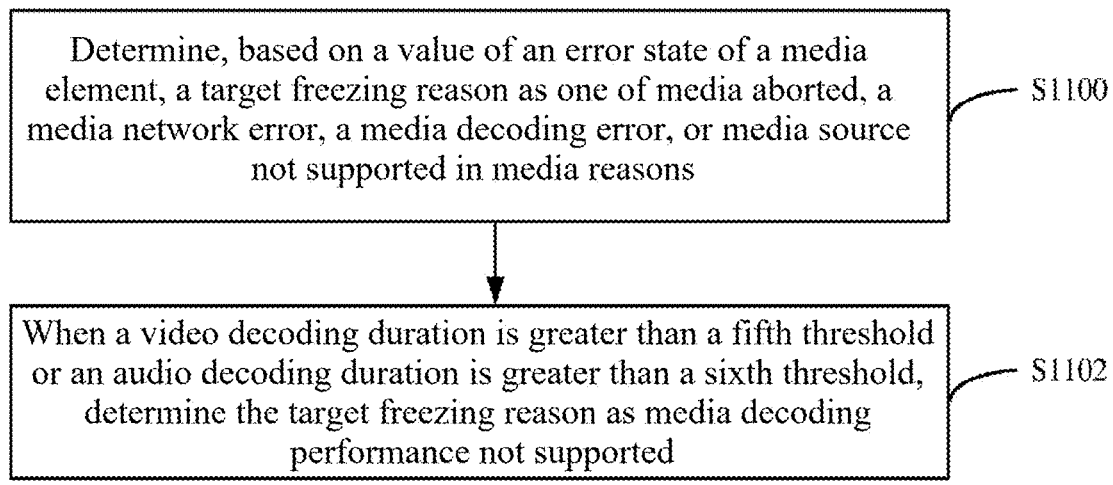

In an exemplary embodiment, as shown in FIG. 11, the step of locating the target freezing reason from the plurality of freezing reasons may include steps S1100 and S1102: step S1100: determining, based on a value of an error state of a media element, the target freezing reason as one of media aborted, a media network error, a media decoding error, or media source not support in the media reasons; or step S1102: or when a video decoding duration is greater than a fifth threshold or an audio decoding duration is greater than a sixth threshold, determining the target freezing reason as media decoding performance not supported. This embodiment lies in that: after various reasons above are excluded, whether the target freezing reason is the media error is determined.

An accurate and refined freezing type is obtained, and a purpose thereof is that a specific problem is located to implement customization optimization. Each general reason is a general term of its unknown sub-categories, a specific type needs to be located to perform specific optimization.

Some optimization solutions are provided below.

Figure 12:
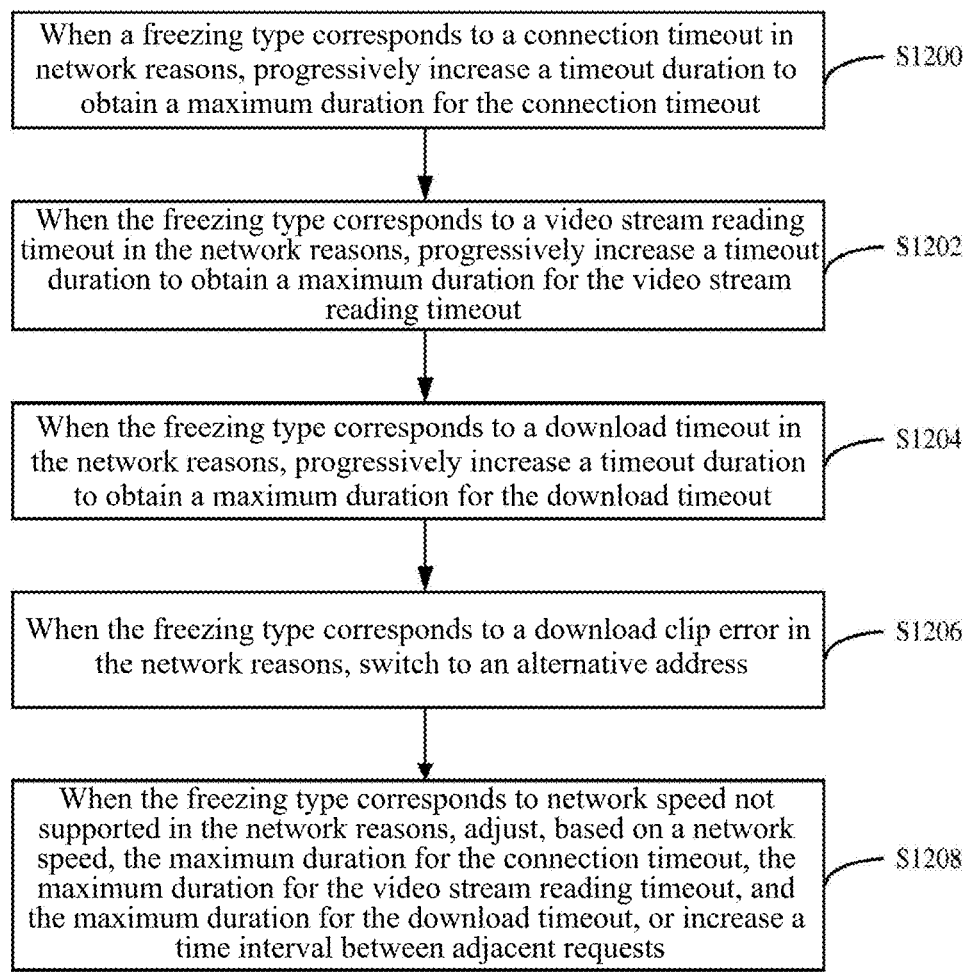
FIGS. 12 to 15 each are a flowchart schematically showing a plurality of newly added steps of a playback optimization method according to Embodiment 1 of the present application.

As shown in FIG. 12, the playback optimization method may further include performing the corresponding optimization operation based on the freezing type, which includes: step S1200: when the freezing type corresponds to the connection timeout in the network reasons, progressively increasing a timeout duration to obtain a maximum duration for the connection timeout; step S1202: when the freezing type corresponds to the video stream reading timeout in the network reasons, progressively increasing a timeout duration to obtain a maximum duration for the video stream reading timeout; step S1204: when the freezing type corresponds to the download timeout in the network reasons, progressively increasing a timeout duration to obtain a maximum duration for the download timeout; and step S1206: when the freezing type corresponds to the download clip error in the network reasons, switching to an alternative address; or step S1208: when the freezing type corresponds to the network speed not supported in the network reasons, adjusting, based on a network speed, the maximum duration for the connection timeout, the maximum duration for the video stream reading timeout, and the maximum duration for the download timeout, or increasing a time interval between adjacent requests.

As an example, the following describes how to optimize the player when the freezing type of the player is X2Z/X2Z2Z, where "2Z" in X2Z is used to represent the network reasons, and "X" is a variable representing the playback state of the player; "2" represents that the freezing reason is a network related reason; and "Z" is another variable used to represent a specific reason in the network reasons, for example, when the freezing reason is the connection timeout in the network reasons, a value of Z is "1". If the video data and the audio data are obtained separately, the X2Z2Z is used for representation.

When a network related error occurs, the requests are all retried for optimization. For example, after a single request fails (for a first time), the request may be retried for Q times, with a total of 1+Q times, and different optimization is performed for a different network reason each time. After the request is retried and the retry fails again, an error may occur in the playback to abort this playback operation.

When the freezing type is X21, duration optimization by progressively increasing a connection timeout duration is used. Each new request has a maximum duration of $P_0$ seconds for the connection timeout, each time the request is retried, the maximum duration for the connection timeout is incremented by $S_0$ seconds, and therefore the maximum duration for the connection timeout of the $Q^{th}$ retry is:

$$TIME_0 = P_0 + Q*S_0.$$

When the freezing type is X22, duration optimization by progressively increasing a clip reading timeout duration is used. Each new request has a maximum duration of $P_1$ seconds for the clip reading timeout, each time the request is retried, the maximum duration for the clip reading timeout is incremented by $S_1$ seconds, and therefore the maximum duration for the clip reading timeout of the $Q^{th}$ retry is:

$$TIME_1 = P_1 + Q*S_1.$$

When the freezing type is X23, duration optimization by progressively increasing a download timeout duration is used. Each new request has a maximum duration of $P_2$ seconds for the download timeout, each time the request is retried, the maximum duration for the download timeout is incremented by $S_2$ seconds, and therefore the maximum duration for the download timeout of the $Q^{th}$ retry is:

$$TIME_2 = P_2 Q*S_2.$$

The above three behaviors are a closed-loop operation in a single network request, a sequence of the behaviors is as follows:

initiating a request, and establishing a connection (the connection timeout may occur);

completing the connection, and preparing to read (the clip reading timeout may occur);

a duration Time (beyond which the download timeout may occur) is set for completion of reading; and $P_0$, $P_1$, $P_2$, $S_0$, $S_1$, $S_2$ described above may be optimum values under a corresponding playback strategy obtained after continuous fine adjustment and experiments.

When the freezing type is X24, a backup-line strategy may be used.

For example, the same audio has three addresses A, B, and C, and when the download clip error occurs in A, the request may be retried and a request for B is used, and so on, thereby reducing freezing caused by a clip request error in a single address.

When the freezing type is X25, the following optimization strategy may be used: values of $P_0$, $P_1$, $P_2$, $S_0$, $S_1$, and $S_2$ described above are dynamically adjusted based on the network speed to enable the player to complete clip download in an environment of a low network speed and reduce freezing caused by the low network speed.

When the network fluctuates (e.g., disconnection occurs in a short period of time), the player may increase a time interval between adjacent requests by $P_3$ seconds, and increase a duration by $S_3$ seconds each time the request is retried, thereby reducing freezing caused by a retry error in network playback in a short period of time.

After the above retry is optimized, if freezing caused due to network reasons is still encountered, the following check operations may be performed:

whether a current network of a user meets requirements of an audio and video code rate;

whether domain name server (DNS) analysis of the current network of the user is normal;

whether an audio and video content delivery network (CDN) is available at present, and the like.

It should be noted that the optimization strategy may be further refined based on a specific value of "X", for example, differentiated optimization may be performed for 325 and 425, respectively. For example, when "X" is 3 and "YZ" is 25, a specific audio/video quality to be selected that may cause the freezing may be located based on "X", and a playback strategy for quality switching, for example, whether to stop quality switching, and which quality may be selected, is optimized through inverse derivation from YZ.

Figure 13:
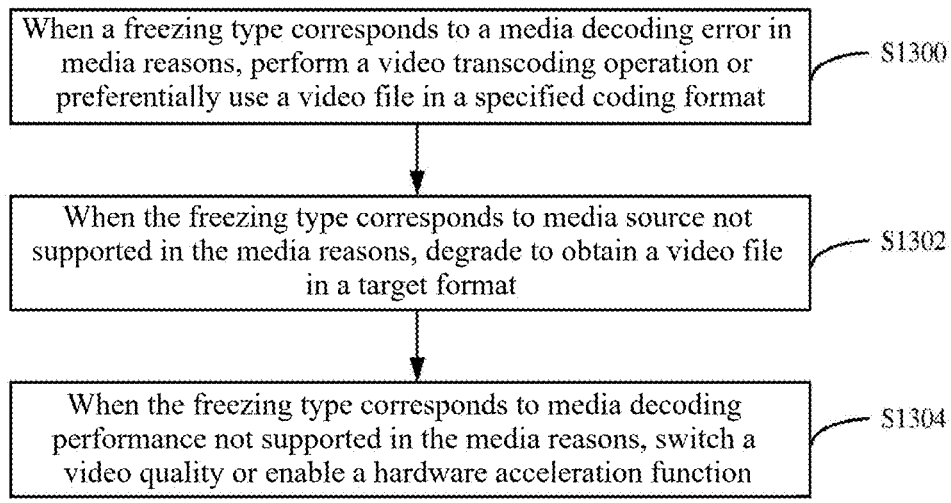

As shown in FIG. 13, the playback optimization method may further include performing the corresponding optimization operation based on the freezing type, which includes: step S1300: when the freezing type corresponds to the media decoding error in the media reasons, performing a video transcoding operation or preferentially using a video file in a specified coding format; step S1302: when the freezing type corresponds to the media source not supported in the media reasons, degrading to obtain a video file in a target format; or step S1304: when the freezing type corresponds to the media decoding performance not supported in the media reasons, switching a video quality or enabling a hardware acceleration function.

As an example, the following describes how to optimize the player when the freezing type of the player is X3Z, where "3Z" in X3Z is used to represent the media reasons, and "X" is a variable representing the playback state of the player; "3" represents that the freezing reason is a media related reason; and "Z" is another variable used to represent a specific reason in the media reasons, for example, when the freezing reason is the media decoding error in the media reasons, a value of Z is "3".

When the freezing type is X33, it indicates that a main reason is that a mobile terminal 4 does not support audio and video coding and audio and video decoding, and preferentially uses videos in coding formats having better compatibility, such as H.264/AVC (a highly compressed digital video codec standard proposed by a joint video team (JVT) consisting of an ITU-T video coding experts group (VCEG) and an ISO/IEC motion picture experts group (MPEG)), advanced audio coding (AAC), motion picture experts group 4 (MPEG4), and the like.

When the freezing type is X34, degradation may be preferentially performed to access a common MP4 file, so as to implement a better compatibility and reduce freezing caused by the media source not supported.

When the freezing type is X35, it indicates that freezing is mainly caused by an excessively long decoding duration, and the quality may be preferentially switched, and a video having low quality is used, thereby reducing decoding pressure and the freezing caused by the excessively long decoding duration.

It should be noted that the optimization strategy may be further refined based on the specific value of "X".

Figure 14:
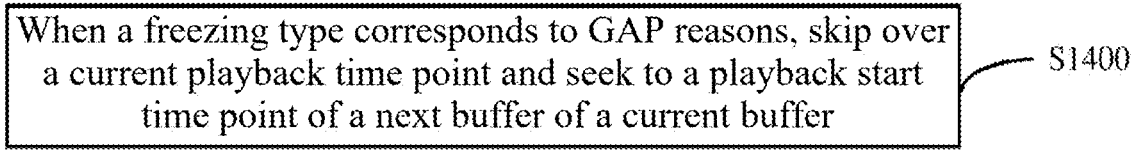

As shown in FIG. 14, the playback optimization method may further include performing the corresponding optimization operation based on the freezing type, which includes: step S1400: when the freezing type corresponds to the GAP reasons, skipping over the current playback time point and seeking to the playback start time point of the next buffer of the current buffer.

As an example, the following describes how to optimize the player when the freezing type of the player is X5Z, where "5Z" in X5Z represents the GAP reasons, and "X" is a variable representing the playback state of the player; "5" represents that the freezing reason is a GAP related reason;

"Z" is another variable used to represent a specific reason in the media reasons, for example, when the freezing reason is the video GAP reason in the media reasons, a value of Z is "1";

and when the freezing reason is the audio GAP reason in the media reasons, a value of Z is "2".

Reasons for generating GAP may be:

(1) caused by a GAP in a source video itself;

(2) caused when a browser renders an audio and video; and (3) caused when a browser trims a buffer.

When the target freezing reason is the GAP reason (X5Z), the following optimization solutions may be used:

whether the player is about to be frozen due to the GAP reasons is pre-estimated based on the quantity of buffers, the current buffer, and the current playback time point. The player may perform optimization processing for the GAP reasons if the following conditions are met:

1. the quantity of buffers≥2;
2. the current buffer is not the last buffer; and
3. the playback end time point inside the current buffer− the current playback time point<a minimum GAP hacking duration (GAP_HACK_TIME, such as 0.3 second).

When the above three conditions are met, the player may perform the following optimization operation: skipping over the current playback time point and seeking to the playback start time point inside the next buffer of the current buffer to avoid freezing caused by the GAP.

It should be noted that the optimization strategy may be further refined based on the specific value of "X".

Figure 15:
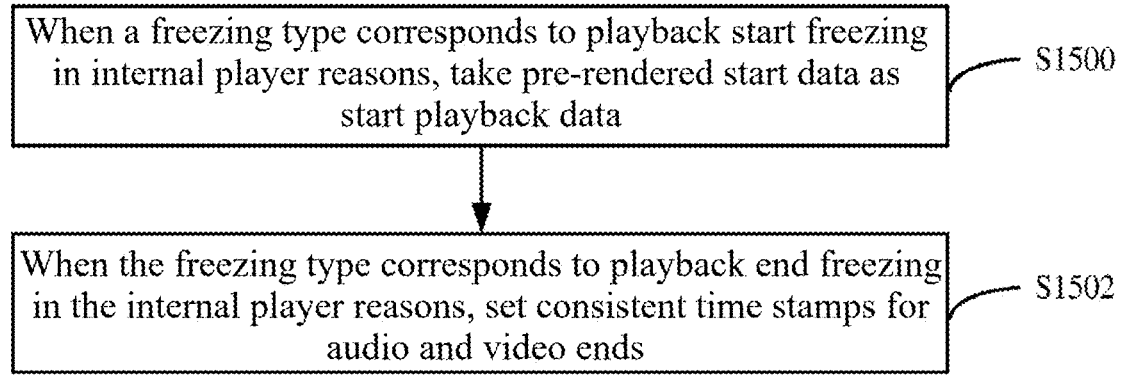

As shown in FIG. 15, the playback optimization method may further include performing the corresponding optimization operation based on the freezing type, which includes: step S1500: when the freezing type corresponds to the playback start freezing in the internal player reasons, taking pre-rendered start data as start playback data; or step S1502: when the freezing type corresponds to the playback end freezing in the internal player reasons, setting consistent time stamps for audio and video ends.

As an example, the following describes how to optimize the player when the freezing type of the player is X6Z, where "6Z" in X6Z is used to represent the internal player reasons, and "X" is a variable representing the playback state of the player; "6" represents that the freezing reason is a related reason of the internal reasons of the player; "Z" is another variable used to represent a specific reason in the internal player reasons, for example, when the freezing reason is the playback start freezing in the internal player reasons, a value of Z is "1"; and when the freezing reason is the playback end freezing in the internal player reasons, a value of Z is "2". It should be noted that the internal player reasons may also be used as general reasons.

When the freezing type is X61, it indicates that the freezing is mainly caused by problems such as start clip request, and the pre-rendered start data may be used as the start playback data.

When the freezing type is X62, it indicates that the freezing is mainly caused by inconsistent lengths of the audio and video, and therefore, the following optimization solution may be adopted: setting consistent time stamps for audio and video ends.

It should be noted that when the freezing type is 211 or 212, it indicates that the freezing is caused by dragging the progress bar. Therefore, the player may not be optimized or may be optimized after a specific period of time.

It should be noted that the optimization strategy may be further refined based on the specific value of "X".

Figure 16:
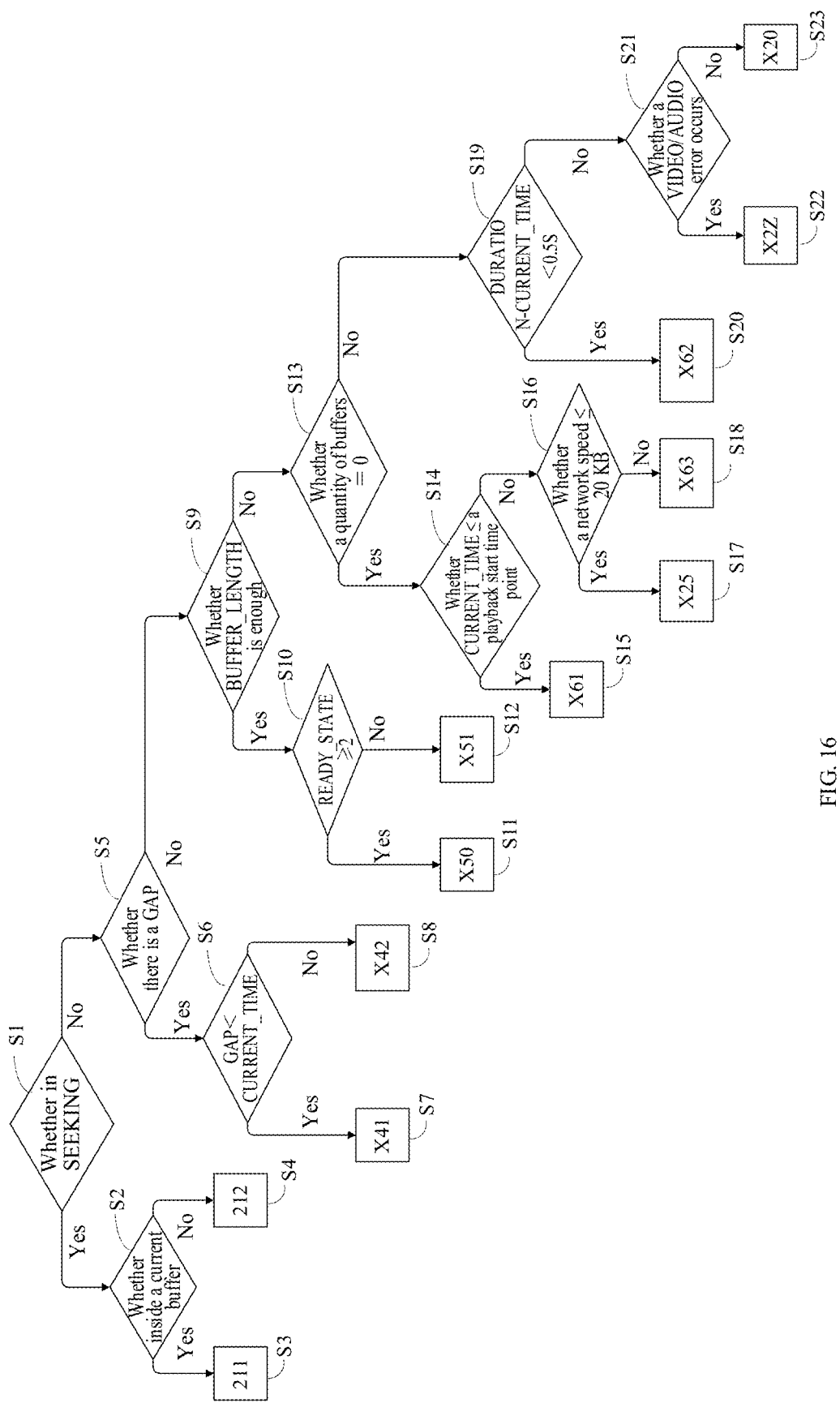
FIG. 16 is a specific flowchart schematically showing determination of a freezing type.

To make the present application clearer and easier to understand, as shown in FIG. 16, a specific example of obtaining the freezing type is provided below.

(1) Preliminary Classification of Freezing, where the Initialized Freezing Type is 100 by Default;

In step S1, whether a player is in a seeking state (SEEKING) is judged; and if the player is in the seeking state, step S2 is performed; or if the player is not in the seeking state, the step S5 is performed.

In step S2, whether seeking is inside a current buffer is judged; and if the seeking is inside the current buffer, step S3 is performed; or if the seeking is outside the current buffer, step S4 is performed.

In step S3, the freezing type is determined as 211,
that is, the inducing freezing reason (the seeking state)+the target freezing reason (the video seeking time being inside the current buffer);

In step S4, the freezing type is determined as 212,
that is, the inducing freezing reason (the seeking state)+the target freezing reason (the video seeking time being outside the current buffer);

In step S5, whether there is a GAP is judged; and if there is the GAP, step S6 is performed; or there is not the GAP, step S9 is performed.

In step S6, whether the GAP is less than a current playback time point CURRENT_TIME is judged; and if the GAP is less than the current playback time point, step S7 is performed; or if the GAP is not less than the current playback time point, step S8 is performed.

In step S7, the freezing type is determined as X41,
that is, the inducing freezing reason being X (a corresponding playback state)+the target freezing reason being a video GAP reason.

In step S8, the freezing type is determined as X42,
that is, the inducing freezing reason being X (the corresponding playback state)+the target freezing reason being an audio GAP reason.

In step S9, whether a remaining length of the current buffer BUFFER_LENGTH is enough is judged; and if the remaining length is enough, step S10 is performed; or if the remaining length is not enough, step S13 is performed.

In step S10, whether a value of a ready state READY_STATE of a media element is greater than or equal to 2 is judged; and if the value of the ready state is greater than or equal to 2, step S11 is performed; or if the value of the ready state is not greater than or equal to 2, step S12 is performed.

In step S11, the freezing type is determined as X50,
that is, the inducing freezing reason being X (the corresponding playback state)+the target freezing reason being a preset general performance reason.

In step S12, the freezing type is determined as X51,
that is, the inducing freezing reason being X (the corresponding playback state)+the target freezing reason being an unknown performance reason.

In step S13, whether buffer data is zero is judged; and if the buffer data is zero, step S14 is performed; or if the buffer data is not zero, step S19 is performed.

In step S14, whether the current playback time point CURRENT_TIME is less than or equal to a playback start time point; and if the current playback time point is less than or equal to the playback start time point, step S15 is performed; or if the current playback time point is not less than or equal to the playback start time point, step S16 is performed.

In step S15, the freezing type is determined as X61,
that is, the inducing freezing reason being X (the corresponding playback state)+the target freezing reason being playback start freezing in the player.

In step S16, whether a network speed is less than or equal to 20 KB is judged; and if the network speed is less than or equal to 20 KB, step S17 is performed; or if the network speed is not less than or equal to 20 KB, step S18 is performed.

In step S17, the freezing type is determined as X25,
that is, the inducing freezing reason being X (the corresponding playback state)+the target freezing reason being the network speed not supported.

In step S18, the freezing type is determined as X63,
that is, the inducing freezing reason being X (the corresponding playback state)+the target freezing reason being abnormal buffer quantity freezing reason in the player.

In step S19, whether a total duration of a current video DURATION−the current playback time point CURRENT_TIME is less than 0.5 second is judged; and if the total duration of the current video DURATION−the current playback time point CURRENT_TIME is less than 0.5 second, step S20 is performed; or if the total duration of the current video DURATION−the current playback time point CURRENT_TIME is not less than 0.5 second, step S21 is performed.

In step S20, the freezing type is determined as X62,
that is, the inducing freezing reason being X (the corresponding playback state)+the target freezing reason being playback end freezing in the player.

In step S21, whether a VIDEO/AUDIO error occurs is judged; and if the VIDEO/AUDIO error occurs, step S22 is performed; or if the VIDEO/AUDIO error does not occur, step S23 is performed.

In step S22, the freezing type is determined as X2Z, that is, the inducing freezing reason being X (the corresponding playback state)+the target freezing reason being a network related reason.

In step S23, the freezing type is determined as X20, that is, the inducing freezing reason being X (the corresponding playback state)+the target freezing reason being an unknown network reason.

(2) Secondary Classification of Freezing

In step S24, the freezing type is determined as X3Z based on a value of an error state of a media element, that is, the inducing freezing reason being X (the corresponding playback state)+the target freezing reason being one of media aborted (31), a media network error (32), a media decoding error (33), or media source not supported (34); and when a video decoding duration VIDEO_DECODING_TIME is greater than a fifth threshold or an audio decoding duration AUDIO_DECODING_TIME is greater than a sixth threshold, a value of "Z" is determined as 5, which corresponds to media decoding performance not supported.

Embodiment 2

Figure 17:
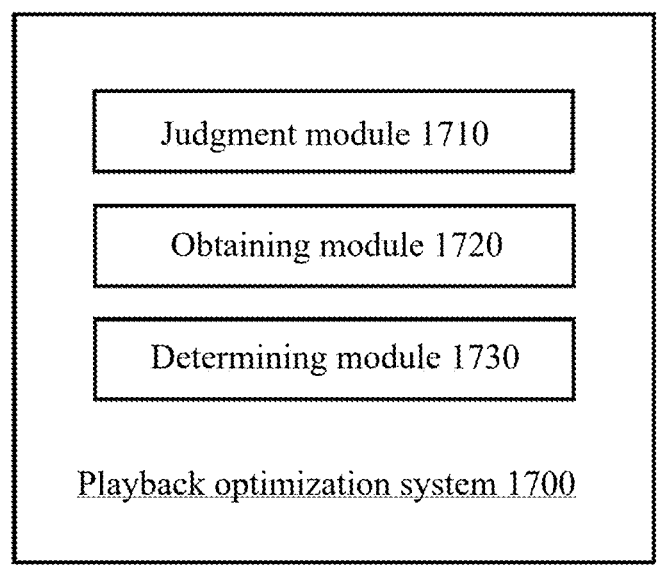
FIG. 17 is a block diagram schematically showing a playback optimization system according to Embodiment 2 of the present application.

FIG. 17 is a block diagram schematically showing a playback optimization system according to Embodiment 2 of the present application. The playback optimization system may be divided into one or more program modules, and the one or more program modules are stored in a storage medium and executed by one or more processors to implement the embodiments of the present application. The program modules referred to in the embodiments of the present application refer to a series of computer-readable instruction segments that can complete a specific function. The functions of various program modules in the embodiments will be specifically described in the following descriptions.

As shown in FIG. 17, the playback optimization system 1700 may include a judgment module 1710, an obtaining module 1720, and a determining module 1730.

The judgment module 1710 is configured to judge whether a player is in a freezing state.

The obtaining module 1720 is configured to obtain freezing information of the player when the player is in the freezing state.

The determining module 1730 is configured to determine a freezing type based on the freezing information, where the freezing type is used to instruct the player to perform a corresponding optimization operation.

In an exemplary embodiment, the freezing information includes first freezing information, where the first freezing information is used to locate a target freezing reason of freezing. The determining module 1730 is further configured to: locate the target freezing reason from a plurality of freezing reasons based on the first freezing information; and determine the freezing type at least based on the target freezing reason, where the plurality of freezing reasons include at least one or more of the following: various seeking reasons associated with media seeking, various network reasons associated with a network, various media reasons associated with media, various GAP reasons associated with time stamps of buffers, various performance reasons associated with performance, or various internal player reasons associated with the interior of the player.

In an exemplary embodiment, the freezing information further includes second freezing information, where the second freezing information is used to locate an inducing freezing reason of freezing. The determining module 1730 is further configured to: determine the freezing type based on the inducing freezing reason and the target freezing reason.

In an exemplary embodiment, the inducing freezing reason includes a target playback state of the player, where the target playback state is one of a plurality of playback states of the player, and the plurality of playback states include more of a normal playback state, a video seeking state, a quality switching state, a video source switching state, a video source updating state, or a video source appending state.

In an exemplary embodiment, the first freezing information includes at least one or more of the following: buffer information, network information, ready state information of a media element, time stamp information of buffers, performance information, decoding information, or error state information of the media element.

In an exemplary embodiment, the determining module 1730 is further configured to: when the player is in a video seeking state, judging whether a video seeking time is inside a current buffer; when the video seeking time is inside the current buffer, determine the target freezing reason as a first seeking reason in the seeking reasons, where the first seeking reason is that the video seeking time is inside the current buffer; and/or when the video seeking time is outside the current buffer, determine the target freezing reason as a second seeking reason in the seeking reasons, where the second seeking reason is that the video seeking time is outside the current buffer.

In an exemplary embodiment, the determining module 1730 is further configured to: when the player is not in a video seeking state, judge whether there is a time stamp gap between a current buffer and a next buffer of the current buffer; when there is the time stamp gap, judge whether the time stamp gap is less than a current playback time point; and when the time stamp gap is less than the current playback time point, determine the target freezing reason as a first-type GAP reason in the GAP reasons; and/or when the time stamp gap is not less than the current playback time point, determine the target freezing reason as a second-type GAP reason in the GAP reasons.

In an exemplary embodiment, the determining module 1730 is further configured to: when the player is not in a video seeking state, and there is no time stamp gap between a current buffer and a next buffer of the current buffer, judge whether a remaining length of the current buffer is greater than a first threshold; when the remaining length of the current buffer is greater than the first threshold, judge whether a value of a ready state of the media element is greater than a second threshold; and when the value of the ready state of the media element is greater than the second threshold, determine the target freezing reason as a first-type performance reason in the performance reasons; and/or when the value of the ready state of the media element is not greater than the second threshold, determine the target freezing reason as a second-type performance reason in the performance reasons.

In an exemplary embodiment, the determining module 1730 is further configured to: when the player is not in a video seeking state, there is no time stamp gap between a current buffer and a next buffer of the current buffer, and a remaining length of the current buffer is not greater than a first threshold, judge whether a quantity of buffers is zero; when the quantity of buffers is not zero, judge whether a current playback time point is not greater than a playback start time point; when the current playback time point is not greater than the playback start time point, determine the target freezing reason as playback start freezing in the internal player reasons; when the current playback time point is greater than the playback start time point, judge whether a network speed is less than a third threshold; and when the network speed is less than the third threshold, determine the target freezing reason as network speed not supported in the network reasons; and/or when the network speed is not less than the third threshold, determine the target freezing reason as the internal player reasons.

In an exemplary embodiment, the determining module 1730 is further configured to: when the player is not in a video seeking state, there is no time stamp gap between a current buffer and a next buffer of the current buffer, a remaining length of the current buffer is not greater than a first threshold, and a quantity of buffers is zero, judge whether a difference between a total duration of a current video and a current playback time point is less than a fourth threshold; and when the difference between the total duration of the current video and the current playback time point is less than the fourth threshold, determine the target freezing reason as playback end freezing in the internal player reasons.

In an exemplary embodiment, the determining module 1730 is further configured to: when the player is not in a video seeking state, there is no time stamp gap between a current buffer and a next buffer of the current buffer, a remaining length of the current buffer is not greater than a first threshold, a quantity of buffers is zero, and a difference between a total duration of a current video and a current playback time point is not less than a fourth threshold, judge whether a Video/Audio error occurs; and when the Video/Audio error occurs, determine the target freezing reason as one of a connection timeout, a video stream reading timeout, a download timeout, a download clip error, or the network speed not supported in the network reasons; or when the Video/Audio error does not occur, determine the target freezing reason as an unknown network error in the network reasons.

In an exemplary embodiment, the determining module 1730 is further configured to: determine, based on a value of an error state of a media element, the target freezing reason as one of media aborted, a media network error, a media decoding error, or media source not supported in the media reasons. or when a video decoding duration is greater than a fifth threshold or an audio decoding duration is greater than a sixth threshold, determine the target freezing reason as media decoding performance not supported.

In an exemplary embodiment, the playback optimization system 1700 may further include an optimization module (not identified) configured to: when the freezing type corresponds to the connection timeout in the network reasons, progressively increase a timeout duration to obtain a maximum duration for the connection timeout; when the freezing type corresponds to the video stream reading timeout in the network reasons, progressively increase a timeout duration to obtain a maximum duration for the video stream reading timeout; when the freezing type corresponds to the download timeout in the network reasons, progressively increase a timeout duration to obtain a maximum duration for the download timeout; and when the freezing type corresponds to the download clip error in the network reasons, switch to an alternative address; or when the freezing type corresponds to the network speed not supported in the network reasons, adjust, based on a network speed, the maximum duration for the connection timeout, the maximum duration for the video stream reading timeout, and the maximum duration for the download timeout, or increase a time interval between adjacent requests.

In an exemplary embodiment, the optimization module is further configured to: when the freezing type corresponds to the media decoding error in the media reasons, perform a video transcoding operation or preferentially use a video file in a specified coding format; when the freezing type corresponds to the media source not supported in the media reasons, degrade to obtain a video file in a target format; or when the freezing type corresponds to the media decoding performance not supported in the media reasons, switch a video quality or enable a hardware acceleration function.

In an exemplary embodiment, the optimization module is further configured to: when the freezing type corresponds to the GAP reasons, skip over the current playback time point and seek to the playback start time point of the next buffer of the current buffer.

In an exemplary embodiment, the optimization module is further configured to: when the freezing type corresponds to the playback start freezing in the internal player reasons, take pre-rendered start data as start playback data; or when the freezing type corresponds to the playback end freezing in the internal player reasons, set consistent time stamps for audio and video ends.

Embodiment 3

Figure 18:
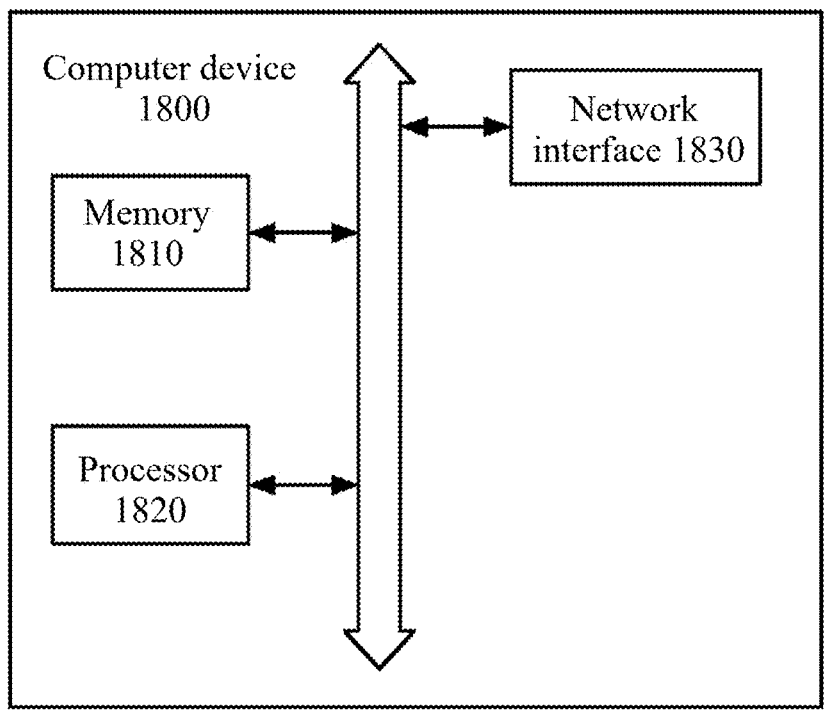
FIG. 18 is a schematic diagram schematically showing hardware architecture of a computer device adapted to implement a playback optimization method according to Embodiment 3 of the present application.

FIG. 18 is a schematic diagram schematically showing a hardware architecture of a computer device 1800 adapted to implement a playback optimization method according to Embodiment 3 of the present application. In this embodiment, the computer device 1800 may be a mobile terminal 4 or a part of the mobile terminal 4. In this embodiment, the computer device 1800 is a device that can automatically perform numerical calculation and/or information processing according to preset or prestored instructions. For example, the computer device 1800 may be a smartphone, a tablet computer, or the like. As shown in FIG. 18, the computer device 1800 at least includes, but is not limited to: a memory 1810, a processor 1820, and a network interface 1830, which may be communicatively linked to each other by using a system bus, where the memory 1810 includes at least one type of computer-readable storage medium, and the readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 1810 may be an internal storage module of the computer device 1800, for example, a hard disk or a memory of the computer device 1800. In some other embodiments, the memory 1810 may alternatively be an external storage device of the computer device 1800, for example, a plug-in type hard disk equipped on the computer device 1800, a smart media card (SMC for short), a secure digital (SD for short) card, or a flash card. Certainly, the memory 1810 may alternatively include both the internal storage module of the computer device 1800 and the external storage device of the computer device. In this embodiment, the memory 1810 is generally configured to store an operating system and various application software installed in the computer device 1800, such as program codes for the playback optimization method. In addition, the memory 1810 may be further configured to temporarily store various types of data that have been output or are to be output.

The processor 1820 may be, in some embodiments, a central processing unit (CPU for short), a controller, a microcontroller, a microprocessor, or other data processing chips. The processor 1820 is generally configured to control overall operation of the computer device 1800, for example, execute control, processing, and the like related to data interaction or communication with the computer device 1800. In this embodiment, the processor 1820 is configured to run program code stored in the memory 1810 or to process data.

The network interface 1830 may include a wireless network interface or a wired network interface. The network interface 1830 is generally configured to establish a communication link between the computer device 1800 and other computer devices. For example, the network interface 1830 is configured to connect the computer device 1800 to an external terminal by using a network and establish a data transmission channel, a communication link, and the like between the computer device 1800 and the external terminal. The network may be a wireless or wired network, such as Intranet, Internet, the Global System for Mobile Communications (GSM for short), wideband code division multiple access (WCDMA for short), a 4G network, a 5G network, Bluetooth, or Wi-Fi.

It should be noted that FIG. 18 shows only a computer device having components 1810 to 1830, but it should be understood that not all of the illustrated components are required to be implemented, and more or fewer components may be implemented instead.

In this embodiment, the playback optimization method stored in the memory 1810 may alternatively be divided into one or more program modules and executed by one or more processors (the processor 1820 in this embodiment) to implement the embodiments of the present application.

Embodiment 4

The present application further provides a computer-readable storage medium storing computer-readable instructions, where when the computer-readable instructions are executed by a processor, the following steps are implemented:

judging whether a player is in a freezing state;
obtaining freezing information of the player when the player is in the freezing state; and
determining a freezing type based on the freezing information, wherein the freezing type is used to instruct the player to perform a corresponding optimization operation.

In this embodiment, the computer-readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the computer-readable storage medium may be an internal storage unit of the computer device, for example, a hard disk or memory of the computer device. In some other embodiments, the computer-readable storage medium may alternatively be an external storage device of the computer device, for example, a plug-in type hard disk equipped on the computer device, a smart media card (SMC for short), a secure digital (SD for short) card, or a flash card. Certainly, the computer-readable storage medium may alternatively include both the internal storage unit of the computer device and the external storage device of the computer device. In this embodiment, the computer-readable storage medium is generally configured to store an operating system and various application software installed in the computer device, such as program codes for the playback optimization method in the embodiments. In addition, the computer-readable storage medium may be configured to temporarily store various types of data that have been output or are to be output.

It will be apparent to those skilled in the art that the various modules or steps in the embodiments of the present application can be implemented by a general-purpose computing apparatus that can be centralized on a single computing apparatus or distributed across a network formed by a plurality of computing apparatuses. Optionally, they may be implemented by program code executable by the computing apparatus, such that they may be stored in a storage apparatus and executed by the computing apparatus, and in some cases, the steps shown or described may be performed in a sequence different from the sequence described herein, or they may be respectively fabricated into individual integrated circuit modules, or a plurality of modules or steps thereof may be implemented as a single integrated circuit module. In this way, the embodiments of the present application are not limited to any specific combination of hardware and software.

It should be noted that, the technical solutions of the present application is mainly/specifically aimed at optimization of a Web player based on DASH streaming media. In addition, the foregoing descriptions are merely preferred embodiments of the present application, and are not intended to limit the patent protection scope of the present application. Any transformation of equivalent structures or equivalent processes that is made using the contents of the description and accompanying drawings of the present application, or any direct or indirect application thereof in other related technical fields shall equally fall within the patent protection scope of the present application.

What is claimed is:

1. A method of optimizing media playback, comprising:
determining whether a player is in a freezing state;
in response to determining that the player is in the freezing state, obtaining first freezing information and second freezing information;
identifying a target freezing reason from a plurality of freezing reasons based on the first freezing information, wherein the plurality of freezing reasons comprise seeking reasons associated with seeking media, network reasons associated with a network, media reasons associated with the media, GAP reasons associated with time stamps between buffers, performance reasons associated with performance, and player internal reasons associated with an interior of the player;
identifying an inducing reason of inducing the freezing state based on the second freezing information, wherein the inducing reason comprises a target playback state of the player, and the target playback state comprises a state of normal playback, a state of seeking video, a state of switching resolution quality, a state of switching video source, a state of updating video source, or a state of appending video source;

determining a freezing type from a plurality of freezing types based on the target freezing reason and the inducing reason; and causing the player to perform an operation of optimizing the media playback corresponding to the freezing type, wherein the causing the player to perform an operation of optimizing the media playback corresponding to the freezing type further comprising:

progressively increasing a timeout duration to obtain a maximum duration for a connection timeout in response to determining that the freezing type corresponds to the connection timeout among the network reasons, progressively increasing a timeout duration to obtain a maximum duration for a video stream reading timeout in response to determining that the freezing type corresponds to the video stream reading timeout among the network reasons, progressively increasing a timeout duration to obtain a maximum duration for a download timeout in response to determining that the freezing type corresponds to the download timeout among the network reasons, switching to an alternative address in response to determining that the freezing type corresponds to a download clip error among the network reasons, and adjusting, based on a network speed, the maximum duration for the connection timeout, the maximum duration for the video stream reading timeout, and the maximum duration for the download timeout, or increasing a time interval between adjacent requests in response to determining that the freezing type corresponds to no support of network speed among the network reasons.

2. The method according to claim 1, wherein the first freezing information comprises information about buffers, information about a network, information indicative of a ready state of a media element, time stamp information between the buffers, performance information, information about decoding, or information indicative of an error state of the media element.

3. The method according to claim 1, wherein the identifying the target freezing reason from the plurality of freezing reasons based on the first freezing information further comprises:

determining whether a time of seeking video is within a current buffer in response to determining that the player is in the state of seeking video;

determining the target freezing reason as a first seeking reason among the seeking reasons in response to determining that the time of seeking video is within the current buffer; and determining the target freezing reason as a second seeking reason among the seeking reasons in response to determining that the time of seeking video is not within the current buffer.

4. The method according to claim 1, wherein the identifying the target freezing reason from the plurality of freezing reasons based on the first freezing information further comprises:

determining whether there is a time stamp gap between a current buffer and a next buffer of the current buffer in response to determining that the player is not in the state of seeking video;

determining whether a value indicating the time stamp gap is less than a value indicating a current playback time point in response to determining that there is the time stamp gap; and determining the target freezing reason as a first-type GAP reason among the GAP reasons in response to determining that the value indicating the time stamp gap is less than the value indicating the current playback time point, or determining the target freezing reason as a second-type GAP reason among the GAP reasons in response to determining that the value indicating the time stamp gap is not less than the value indicating the current playback time point.

5. The method according to claim 1, wherein the identifying the target freezing reason from the plurality of freezing reasons based on the first freezing information further comprises:

determining whether a remaining length of the current buffer is greater than a first threshold in response to determining that the player is not in the state of seeking video and that there is no time stamp gap between a current buffer and a next buffer of the current buffer;

determining whether a value indicating a ready state of a media element is greater than a second threshold in response to determining that the remaining length of the current buffer is greater than the first threshold; and determining the target freezing reason as a first-type performance reason among the performance reasons in response to determining that the value indicating the ready state of the media element is greater than the second threshold; and determining the target freezing reason as a second-type performance reason among the performance reasons in response to determining that the value indicating the ready state of the media element is not greater than the second threshold.

6. The method according to claim 1, wherein the identifying the target freezing reason from the plurality of freezing reasons based on the first freezing information further comprises:

determining whether a quantity of buffers is zero in response to determining that the player is not in the state of seeking video, that there is no time stamp gap between a current buffer and a next buffer of the current buffer, and that a remaining length of the current buffer is not greater than a first threshold;

determining whether a current playback time point is not greater than a playback start time point in response to determining that the quantity of buffers is not zero;

determining the target freezing reason as start freezing among the player internal reasons in response to determining that the current playback time point is not greater than the playback start time point;

determining whether a network speed is less than a third threshold in response to determining that the current playback time point is greater than the playback start time point; and determining the target freezing reason as no support of network speed among the network reasons in response to determining that the network speed is less than the third threshold; and determining the target freezing reason as one of the player internal reasons in response to determining that the network speed is not less than the third threshold.

7. The method according to claim 1, wherein the identifying the target freezing reason from the plurality of freezing reasons based on the first freezing information further comprises:

determining whether a difference between a value indicating a total duration of a current video and a value indicating a current playback time point is less than a fourth threshold in response to determining that the player is not in the state of seeking video, that there is no time stamp gap between a current buffer and a next buffer of the current buffer, that a remaining length of the current buffer is not greater than a first threshold, and that a quantity of buffers is zero; and determining the target freezing reason as end freezing among the player internal reasons in response to determining that the difference between the value indicating the total duration of the current video and the value indicating the current playback time point is less than the fourth threshold.

8. The method according to claim 1, wherein the identifying the target freezing reason from the plurality of freezing reasons based on the first freezing information further comprises:

determining whether a Video/Audio error occurs in response to determining that the player is not in the state of seeking video, that there is no time stamp gap between a current buffer and a next buffer of the current buffer, that a remaining length of the current buffer is not greater than a first threshold, that a quantity of buffers is zero, and that a difference between a value indicating a total duration of a current video and a value indicating a current playback time point is not less than a fourth threshold;

determining the target freezing reason as one of a connection timeout, a video stream reading timeout, a download timeout, a download clip error, or no support of network speed among the network reasons in response to determining that the Video/Audio error occurs; and determining the target freezing reason as an unknown network error among the network reasons in response to determining that the Video/Audio error does not occur.

9. The method according to claim 1, wherein the identifying the target freezing reason from the plurality of freezing reasons based on the first freezing information further comprises:

determining, based on a value of an error state of a media element, the target freezing reason as one of media aborted, a media network error, a media decoding error, or no support of media source among the media reasons; and determining the target freezing reason as no support of media decoding in response to determining that a video decoding duration is greater than a fifth threshold or an audio decoding duration is greater than a sixth threshold.

10. The method according to claim 1 wherein the causing the player to perform an operation of optimizing the media playback corresponding to the freezing type further comprising:

performing a video transcoding operation or preferentially using a video file in a specified coding format in response to determining that the freezing type corresponds to a media decoding error among the media reasons;

degrading to obtain a video file in a target format in response to determining that the freezing type corresponds to no support of media source among the media reasons; or switching a video quality or enabling a hardware acceleration function in response to determining that the freezing type corresponds to no support of media decoding among the media reasons.

11. The method according to claim 1, wherein the causing the player to perform an operation of optimizing the media playback corresponding to the freezing type further comprising:

skipping over a current playback time point and seeking to a start time point of a next buffer of the current buffer in response to determining that the freezing type corresponds to one of the GAP reasons.

12. The method according to claim 1, wherein the causing the player to perform an operation of optimizing the media playback corresponding to the freezing type further comprising:

identifying pre-rendered start data as start data of the playback in response to determining that the freezing type corresponds to start freezing among the player internal reasons; and setting consistent time stamps for audio end and video end in response to determining that the freezing type corresponds to end freezing among the player internal reasons.

13. A computer device, comprising a memory, a processor, and computer-readable instructions stored on the memory and executable by the processor, wherein execution of the computer-readable instructions causes the processor to implement operations comprising:

determining whether a player is in a freezing state;

in response to determining that the player is in the freezing state, obtaining first freezing information and second freezing information;

identifying a target freezing reason from a plurality of freezing reasons based on the first freezing information, wherein the plurality of freezing reasons comprise seeking reasons associated with seeking media, network reasons associated with a network, media reasons associated with the media, GAP reasons associated with time stamps between buffers, performance reasons associated with performance, and player internal reasons associated with an interior of the player;

identifying an inducing reason of inducing the freezing state based on the second freezing information, wherein the inducing reason comprises a target playback state of the player, and the target playback state comprises a state of normal playback, a state of seeking video, a state of switching resolution quality, a state of switching video source, a state of updating video source, or a state of appending video source;

determining a freezing type from a plurality of freezing types based on the target freezing reason and the inducing reason; and causing the player to perform an operation of optimizing the media playback corresponding to the freezing type, wherein the causing the player to perform an operation of optimizing the media playback corresponding to the freezing type further comprising:

progressively increasing a timeout duration to obtain a maximum duration for a connection timeout in response to determining that the freezing type corresponds to the connection timeout among the network reasons, progressively increasing a timeout duration to obtain a maximum duration for a video stream reading timeout in response to determining that the freezing type corresponds to the video stream reading timeout among the network reasons, progressively increasing a timeout duration to obtain a maximum duration for a download timeout in response to determining that the freezing type corresponds to the download timeout among the network reasons, switching to an alternative address in response to determining that the freezing type corresponds to a download clip error among the network reasons, and adjusting, based on a network speed, the maximum duration for the connection timeout, the maximum duration for the video stream reading timeout, and the maximum duration for the download timeout, or increasing a time interval between adjacent requests in response to determining that the freezing type corresponds to no support of network speed among the network reasons.

14. A non-transitory computer-readable storage medium having computer-readable instructions stored thereon, wherein when executed by at least one processor, the computer-readable instructions cause the at least one processor to perform operations comprising:

determining whether a player is in a freezing state;

in response to determining that the player is in the freezing state, obtaining first freezing information and second freezing information;

identifying a target freezing reason from a plurality of freezing reasons based on the first freezing information, wherein the plurality of freezing reasons comprise seeking reasons associated with seeking media, network reasons associated with a network, media reasons associated with the media, GAP reasons associated with time stamps between buffers, performance reasons associated with performance, and player internal reasons associated with an interior of the player;

identifying an inducing reason of inducing the freezing state based on the second freezing information, wherein the inducing reason comprises a target playback state of the player, and the target playback state comprises a state of normal playback, a state of seeking video, a state of switching resolution quality, a state of switching video source, a state of updating video source, or a state of appending video source;

determining a freezing type among a plurality of freezing types based on the target freezing reason and the inducing reason; and causing the player to perform an operation of optimizing the media playback corresponding to the freezing type, wherein the causing the player to perform an operation of optimizing the media playback corresponding to the freezing type further comprising:

progressively increasing a timeout duration to obtain a maximum duration for a connection timeout in response to determining that the freezing type corresponds to the connection timeout among the network reasons, progressively increasing a timeout duration to obtain a maximum duration for a video stream reading timeout in response to determining that the freezing type corresponds to the video stream reading timeout among the network reasons, progressively increasing a timeout duration to obtain a maximum duration for a download timeout in response to determining that the freezing type corresponds to the download timeout among the network reasons, switching to an alternative address in response to determining that the freezing type corresponds to a download clip error among the network reasons, and adjusting, based on a network speed, the maximum duration for the connection timeout, the maximum duration for the video stream reading timeout, and the maximum duration for the download timeout, or increasing a time interval between adjacent requests in response to determining that the freezing type corresponds to no support of network speed among the network reasons.

* * * * *